US012468245B2

(12) United States Patent
Wakatsu et al.

(10) Patent No.: US 12,468,245 B2
(45) Date of Patent: Nov. 11, 2025

(54) FIXING UNIT WITH A FILM REGULATING SURFACE DISPOSED UPSTREAM OF THE CENTER OF A NIP PORTION AND IMAGE FORMING APPARATUS

(71) Applicant: Canon Kabushiki Kaisha, Tokyo (JP)

(72) Inventors: Kohei Wakatsu, Kanagawa (JP); Tsuguhiro Yoshida, Kanagawa (JP); Kazuhiro Doda, Kanagawa (JP); Toshiyuki Watanabe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/526,138

(22) Filed: Dec. 1, 2023

(65) Prior Publication Data

US 2024/0201623 A1 Jun. 20, 2024

(30) Foreign Application Priority Data

Dec. 16, 2022 (JP) ................................ 2022-201446

(51) Int. Cl.
*G03G 15/20* (2006.01)

(52) U.S. Cl.
CPC ..... *G03G 15/2053* (2013.01); *G03G 15/2064* (2013.01); *G03G 2215/2025* (2013.01)

(58) Field of Classification Search
CPC ....... G03G 2215/2025; G03G 15/2017; G03G 15/2064
See application file for complete search history.

(56) References Cited

U.S. PATENT DOCUMENTS

| | | | | | |
|---|---|---|---|---|---|
| 5,196,895 | A * | 3/1993 | Setoriyama | G03G 15/2064 399/328 |
| 8,798,514 | B2 * | 8/2014 | Tanaka | G03G 15/2053 399/329 |
| 9,223,268 | B2 | 12/2015 | Yamaguchi et al. | |
| 9,639,044 | B2 * | 5/2017 | Hayashi | G03G 15/2053 |
| 9,740,150 | B2 | 8/2017 | Tsunashima et al. | |

(Continued)

FOREIGN PATENT DOCUMENTS

| | | | |
|---|---|---|---|
| JP | H0444080 A | | 2/1992 |
| JP | 2002246151 A | * | 8/2002 |

(Continued)

OTHER PUBLICATIONS

English translation of JP_2006039184.*

*Primary Examiner* — Arlene Heredia Ocasio
(74) *Attorney, Agent, or Firm* — Venable LLP

(57) ABSTRACT

A fixing unit includes a film, a nip forming member, a heating unit, a rotary member arranged to sandwich the film together with the nip forming member, and an end portion regulating member configured to be in sliding contact with the film and to regulate an end portion of the film in the longitudinal direction. The end portion regulating member includes a first surface facing an inner surface of the film, a second surface facing an end face of the film in the longitudinal direction, and a third surface facing an outer surface of the film and configured to regulate the end portion of the film from deforming in a manner separating from the first surface. An entirety of the third surface is disposed on an upstream side of a center position of the nip portion in a conveyance direction of the recording material in the nip portion.

12 Claims, 18 Drawing Sheets

(56) References Cited

U.S. PATENT DOCUMENTS

| | | | | |
|---|---|---|---|---|
| 10,429,782 | B2 * | 10/2019 | Honke | G03G 15/2017 |
| 11,022,917 | B2 * | 6/2021 | Saito | G03G 15/2028 |
| 11,994,815 | B2 * | 5/2024 | Yoshida | G03G 15/2064 |
| 2014/0301760 | A1 * | 10/2014 | Nanjo | G03G 15/2053 399/329 |

FOREIGN PATENT DOCUMENTS

| | | | | |
|---|---|---|---|---|
| JP | 2004163464 | A | * | 6/2004 |
| JP | 2006039184 | A | | 2/2006 |
| JP | 2015052681 | A | | 3/2015 |

* cited by examiner

O−D

O−C

O−E(O−F)

O–D

O-D

O-C(O-E)

O-F

FIXING UNIT WITH A FILM REGULATING SURFACE DISPOSED UPSTREAM OF THE CENTER OF A NIP PORTION AND IMAGE FORMING APPARATUS

BACKGROUND OF THE INVENTION

Field of the Invention

The present invention relates to a fixing unit for fixing an image on a recording material, and to an image forming apparatus for forming an image on a recording material.

Description of the Related Art

In image forming apparatuses, a configuration of a film heating system for heating an image through a tubular film is known as a fixing unit for fixing an image formed on a recording material to a recording material. Japanese Patent Application Laid-Open Publication No. H04-044080 discloses an end portion regulating member having a flange shape that regulates lateral shift of a film in a longitudinal direction by being in contact with an end face of the film in the lateral direction.

In a case where a force that shifts the film in the lateral direction is strong, an end portion of the film is deformed toward an outer diameter side by reactive force that the end face receives from the end portion regulating member, by which damages such as folding and bending may occur to the end portion of the film.

SUMMARY OF THE INVENTION

The present invention provides a fixing unit in which damaging of a film is less likely to occur, and an image forming apparatus equipped with the same.

According to one aspect of the invention, a fixing unit includes a film having a tubular shape and extending in a longitudinal direction, a nip forming member arranged in an interior space of the film, a heating unit configured to heat the film, a rotary member arranged to sandwich the film together with the nip forming member, the rotary member being configured to form a nip portion between the nip forming member and the rotary member and to nip a recording material with the film at the nip portion to convey the recording material, and an end portion regulating member configured to be in sliding contact with the film and to regulate an end portion of the film in the longitudinal direction, wherein the end portion regulating member includes a first surface facing an inner surface of the film, a second surface facing an end face of the film in the longitudinal direction, and a third surface facing an outer surface of the film and configured to regulate the end portion of the film from deforming in a manner separating from the first surface, and wherein an entirety of the third surface is disposed on an upstream side of a center position of the nip portion in a conveyance direction of the recording material in the nip portion.

According to another aspect of the invention, a fixing unit includes a film having a tubular shape and extending in a longitudinal direction, a nip forming member arranged in an interior space of the film, a heating unit configured to heat the film, a rotary member arranged to sandwich the film together with the nip forming member, the rotary member being configured to form a nip portion between the nip forming member and the rotary member and to nip a recording material with the film at the nip portion to convey the recording material, and an end portion regulating member configured to be in sliding contact with the film and to regulate an end portion of the film in the longitudinal direction, wherein the end portion regulating member includes a first surface facing an inner surface of the film, a second surface facing an end face of the film in the longitudinal direction, and a third surface facing an outer surface of the film and configured to regulate the end portion of the film from deforming in a manner separating from the first surface, wherein the third surface is disposed on an upstream side and on a downstream side of a center position of the nip portion in a conveyance direction of the recording material in the nip portion, and wherein a distance between the first surface and the third surface at a position of a most upstream portion of the first surface in the conveyance direction is smaller than a distance between the first surface and the third surface at a position of a most downstream portion of the first surface in the conveyance direction.

According to another aspect of the invention, a fixing unit includes a film having a tubular shape and extending in a longitudinal direction, a nip forming member arranged in an interior space of the film, a heating unit configured to heat the film, a rotary member arranged to sandwich the film together with the nip forming member, the rotary member being configured to form a nip portion between the nip forming member and the rotary member and to nip a recording material with the film at the nip portion to convey the recording material, and an end portion regulating member configured to regulate an end portion of the film in the longitudinal direction, wherein the end portion regulating member includes a first surface facing an inner surface of the film, and a second surface facing an end face of the film in the longitudinal direction, wherein the second surface includes an inclined portion that is inclined such that an angle between the first surface and the inclined portion of the second surface is an acute angle, and that is configured to regulate the end portion of the film in the longitudinal direction from deforming in a manner separating from the first surface, and wherein an entirety of the inclined portion is disposed on an upstream side of a center position of the nip portion in a conveyance direction of the recording material in the nip portion.

Further features of the present invention will become apparent from the following description of exemplary embodiments with reference to the attached drawings.

DESCRIPTION OF THE EMBODIMENTS

Now, preferred embodiments according to the present disclosure will be described with reference to the drawings.

In the present disclosure, the term "image forming apparatus" includes a wide variety of apparatuses for forming, or recording, images on recording materials, such as a single-function printer, a copying machine, a multifunction machine, and a commercial printing machine. The term "fixing unit" includes a wide variety of apparatuses, such as image heating apparatuses, for heating images being formed on recording materials in the image forming apparatus and fixing the images onto the recording materials.

First Embodiment

Figure 2:
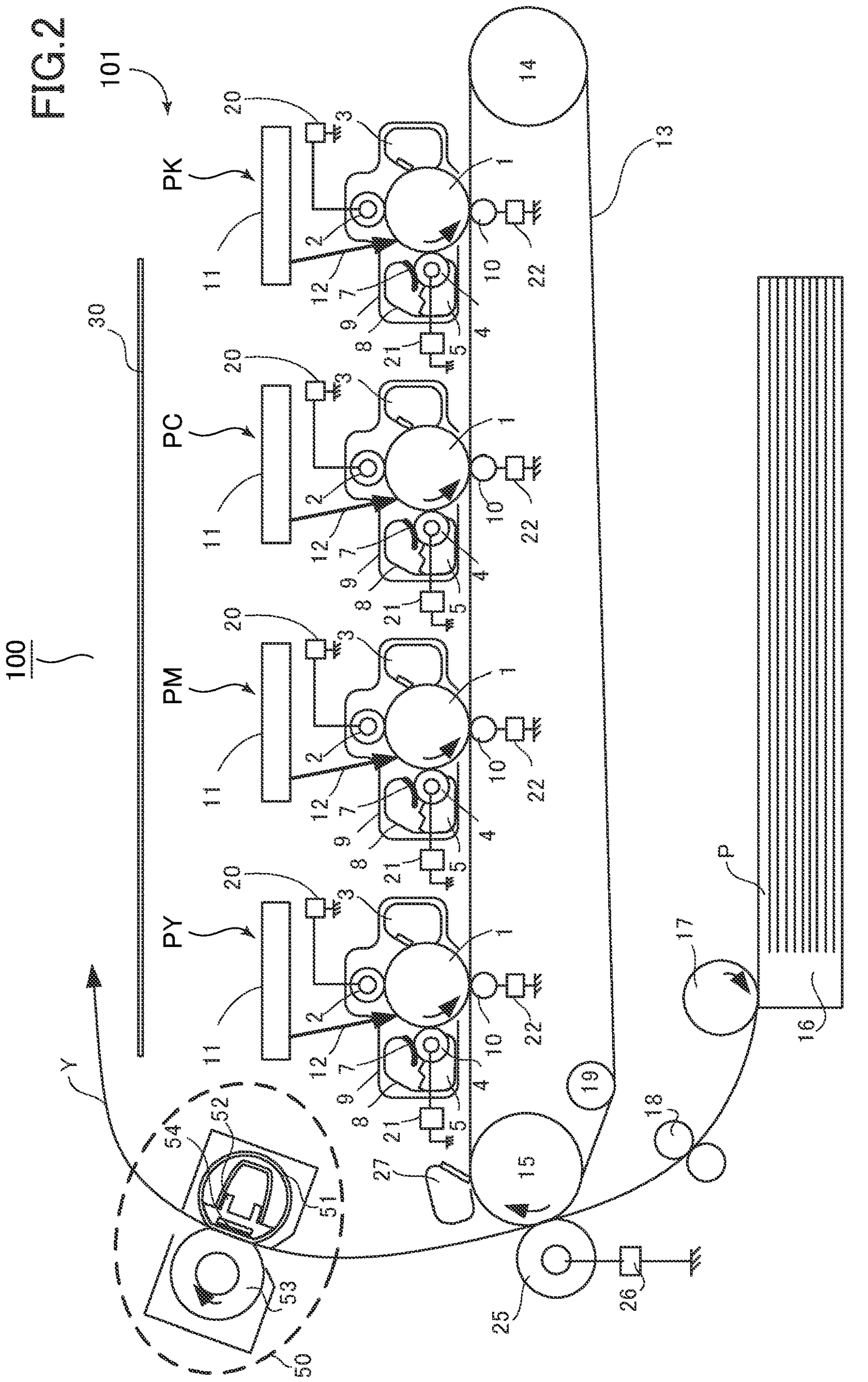
FIG. 2 is a schematic drawing of an image forming apparatus according to the first embodiment.

FIG. 2 is a schematic drawing illustrating a configuration of an image forming apparatus 100 according to a first embodiment. The image forming apparatus 100 is a so-called in-line color printer having four stations, i.e., image forming stations, or process units, PY, PM, PC, and PK aligned along an intermediate transfer belt 13. The image forming apparatus 100 may form an image on a recording material P based on image information received from an exterior or image information read from a document by an image reading apparatus connected to the image forming apparatus 100. Various types of sheet materials of various sizes and materials may be used as the recording material P, i.e., recording medium, such as paper including normal paper and thick paper, sheet materials such as coated paper having a surface treatment applied thereto, special-shaped sheet materials such as envelopes and index paper, plastic films, and cloths.

The image forming apparatus 100 includes an image forming unit 101, and a fixing unit 50. The image forming unit 101 includes a first station PY for forming yellow toner image, a second station PM for forming magenta toner image, a third station PC for forming cyan toner image, and a fourth station PK for forming black toner image. Further, the image forming unit 101 includes the intermediate transfer belt 13 serving as an intermediate transfer body, four primary transfer rollers 10, and a secondary transfer roller 25 serving as a transfer unit.

The configuration of four stations PY to PK is basically the same, except for the difference of the color of developer, or toner, being used for developing images. Each of the stations PY to PK includes a photosensitive drum 1 serving as an image bearing member, a charging roller 2 serving as a charging unit, an exposing unit 11 serving as an exposing portion, a developing unit 8 serving as a developing portion, and a cleaning unit 3.

The photosensitive drum 1 is composed of an electrophotographic photosensitive member such as an organic photoconductor (OPC). The photosensitive drum 1 according to the present embodiment has multiple layers of organic functional materials, including a carrier generation layer for generating charge during photoreception and a charge transfer layer for transferring the charge being generated, formed on a metal cylinder. An outermost layer of the photosensitive drum 1 has low electrical conductivity and is approximately insulative. The charging roller 2 is abutted against a surface of the photosensitive drum 1 and is configured to be rotated following the rotation of the photosensitive drum 1. When forming images, DC voltage or voltage obtained by superposing AC voltage to DC voltage is applied to the charging roller 2. By applying such voltage, the charging roller 2 is configured to generate discharge at a minute air gap formed at a contact portion, or charging nip, between the charging roller 2 and the photosensitive drum 1 on upstream and downstream sides of the photosensitive drum 1 in a direction of rotation thereof.

The developing unit 8 includes a developing roller 4, a developing blade 7 in contact with the developing roller 4, and a storage portion that stores toner 5 serving as developer. Toner 5 is a nonmagnetic one-component toner, for example. The photosensitive drum 1, the charging roller 2, the cleaning unit 3, and the developing unit 8 are composed as an integrated process cartridge 9 that is detachably attached to a casing of the image forming apparatus 100. The exposing unit 11 is a laser scanner unit that scans laser light using a polygon mirror, or an LED exposing unit equipped with a light emitting diode (LED) array. The exposing unit 11 irradiates the photosensitive drum 1 with a scanning beam 12 that is modulated based on image signals generated from image information.

The charging roller 2 is connected to a charging power supply 20 serving as a voltage supply unit to the charging roller 2. The developing roller 4 is connected to a developing power supply 21 serving as a voltage supply unit to the developing roller 4. The primary transfer roller 10 is connected to a primary transfer high voltage power supply 22 serving as a voltage supply unit to the primary transfer roller 10. The secondary transfer roller 25 is connected to a secondary transfer high voltage power supply 26 serving as a voltage supply unit to the secondary transfer roller 25.

The intermediate transfer belt 13 is stretched across three rollers, which are a secondary transfer counter roller 15, a tension roller 14, and an auxiliary roller 19. The tension roller 14 presses the intermediate transfer belt 13 from an inner circumference side by being urged by a spring to maintain an appropriate tension of the intermediate transfer belt 13. The secondary transfer counter roller 15 is driven by a main motor and rotated, thereby rotating the intermediate transfer belt 13. The intermediate transfer belt 13 is rotated at approximately a same speed as a peripheral speed of the photosensitive drum 1 along a direction of rotation of the photosensitive drum 1 of each of the stations PY to PK, that is, a counterclockwise direction in FIG. 2. The primary transfer roller 10 is arranged to abut against the respective photosensitive drums 1 interposing the intermediate transfer belt 13. The position at which the photosensitive drum 1 and the primary transfer roller 10 abut against each other interposing the intermediate transfer belt 13 is called a primary transfer position. The auxiliary roller 19, the tension roller 14, and the secondary transfer counter roller 15 are electrically grounded.

The secondary transfer roller 25 is arranged to abut against the secondary transfer counter roller 15 interposing the intermediate transfer belt 13. A secondary transfer portion is formed as a contact portion, i.e., nip portion, between the secondary transfer roller 25 and the intermediate transfer belt 13.

The fixing unit 50 is equipped with a film 51 having a tubular shape, nip forming members (52, 54) arranged in an inner space of the film 51, a pressure roller 53 that abuts against the nip forming member while sandwiching the film 51 together with the nip forming member, and a heating unit that heats the film 51. A fixing nip is formed between the pressure roller 53 and the nip forming members. The details of the fixing unit 50 will be described later.

Next, an image forming operation of the image forming apparatus 100 will be described. In a standby state, when an execution command, i.e., print command, of the image forming operation is received, the image forming apparatus 100 starts the image forming operation. At first, the respective photosensitive drums 1 and the intermediate transfer belt 13 start to rotate in a direction of the arrow in the drawing at a predetermined peripheral speed, i.e., processing speed.

The photosensitive drum 1 is charged uniformly by the charging roller 2 having voltage applied thereto from the charging power supply 20. Next, an electrostatic latent image based on an image information is formed on a surface of the photosensitive drum 1 by irradiation of a scanning beam 12 from the exposing unit 11. Toner 5 within the developing unit 8 is charged to negative polarity by the developing blade 7 and applied onto the developing roller 4. A predetermined developing voltage is supplied from the developing power supply 21 to the developing roller 4. When the electrostatic latent image borne on the photosensitive drum 1 reaches the developing roller 4, the electrostatic latent image is developed into a monochrome toner image by toner supplied from the developing roller 4. The monochrome toner image formed on the photosensitive drum 1 is transferred, i.e., primarily transferred, to the intermediate transfer belt 13 by the primary transfer roller 10 to which a DC voltage having opposite polarity as the charged polarity of toner is applied. Toner remaining on the photosensitive drum 1 without being transferred to the intermediate transfer belt 13, i.e., transfer residual toner, is removed by the cleaning unit 3.

The toner image creation process described above in the respective stations PY to PK is performed in parallel in the stations PY to PK at deviated timings. In that case, a control timing at which a control unit of the image forming apparatus 100 outputs signals, i.e., write signals, to instruct starting of exposure to the four exposing units 11 is controlled according to the distances between the primary transfer positions. Thereby, a full color image formed by superposing monochrome toner images of respective colors is formed on the intermediate transfer belt 13. This image is conveyed toward the secondary transfer portion by the rotation of the intermediate transfer belt 13.

In parallel with the forming of images in the image forming unit 101, the recording materials P stored in a cassette 16 of the image forming apparatus 100 are fed one sheet at a time by a feed roller 17. The recording material P is conveyed via a registration roller 18 to the secondary transfer portion. Then, the image borne on the intermediate transfer belt 13 is transferred, i.e., secondarily transferred, to the recording material P by the secondary transfer roller 25 to which a voltage of opposite polarity as the charging polarity of toner is applied. Toner remaining on the intermediate transfer belt 13 without being transferred to the recording material P, i.e., transfer residual toner, is removed by a cleaning unit 27.

The recording material P having passed through the secondary transfer portion is conveyed to the fixing unit 50. The fixing unit 50 heats the image on the recording material P while nipping and conveying the recording material P at the fixing nip to thereby fix the image on the recording material P. The recording material P having passed through the fixing unit 50 is discharged onto a sheet discharge tray 30 as a product.

The image forming unit 101 described above is an example of an image forming unit. Other types of image forming units may be adopted, such as a direct transfer electrophotographic unit in which toner image formed on a photosensitive drum is transferred to the recording material P without passing through an intermediate transfer body. Further, the image forming unit may be a unit for forming a monochrome image using one type of developer or toner.

Fixing Unit

Next, a configuration of the fixing unit 50 according to the first embodiment will be described with reference to FIGS. 3A to 3C. In the following description, a longitudinal direction, i.e., generating line direction, of the film 51 of the fixing unit 50 is referred to as “X direction”. The X direction is a longitudinal direction of the fixing unit 50, and it is a direction orthogonal to a recording material conveyance direction (conveyance direction of the recording material) at the fixing nip. The recording material conveyance direction at the fixing nip is referred to as “Y direction”. Further, a direction orthogonal to both the X direction and the Y direction is referred to as “Z direction”. The Z direction is a height direction of the fixing unit 50, which is a thickness direction of the recording material at the fixing nip. The Z direction is not necessary the same as a vertical direction, i.e., gravity direction. As described later, in a case where a heater 54 forms a fixing nip Na, the X direction is a longitudinal direction in a surface where a heating element of the heater 54 is arranged, and the Y direction is a short direction that is orthogonal to the longitudinal direction at the relevant surface of the heater 54. In the above-mentioned case, the Z direction is a thickness direction of the heater 54 orthogonal to both the longitudinal direction and the short direction. Further, as needed, a sign “+” is attached after the X, Y, and Z directions to indicate a downstream side, that is, head of the arrows in the drawings, and a sign “−” is attached after the X, Y, and Z directions to indicate an upstream side, that is, trailing end of the arrows in the drawings.

Figure 3A:
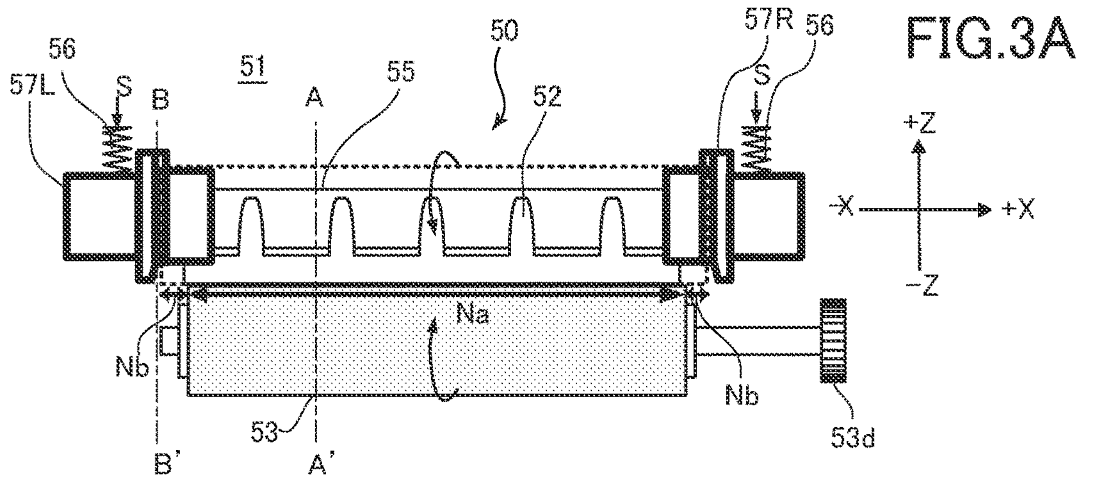
FIGS. 3A to 3C are each a view illustrating a configuration of a fixing unit according to the first embodiment.

FIG. 3A is a view of the fixing unit 50 viewed from the −Y side, that is, upstream side in the recording material conveyance direction. FIG. 3B is a view of the fixing unit 50 viewed from the +Z side, that is, side of the film 51 in the height direction. FIG. 3C is a cross-sectional view of the fixing unit 50 taken at line A-A' of FIG. 3A. In FIGS. 3A and 3B, an exterior shape of the film 51 is illustrated by dotted lines and the film 51 is shown in perspective to illustrate the configuration of the inner side of the apparatus.

Figure 3B:
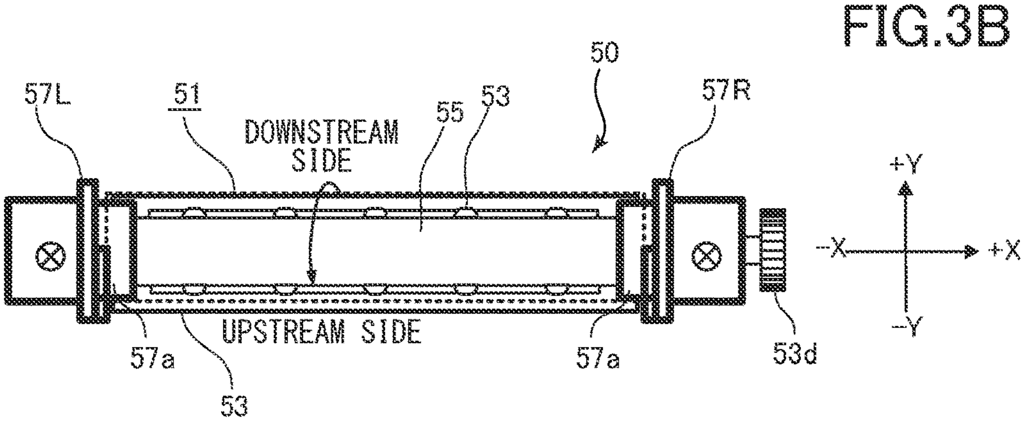
Figure 3C:
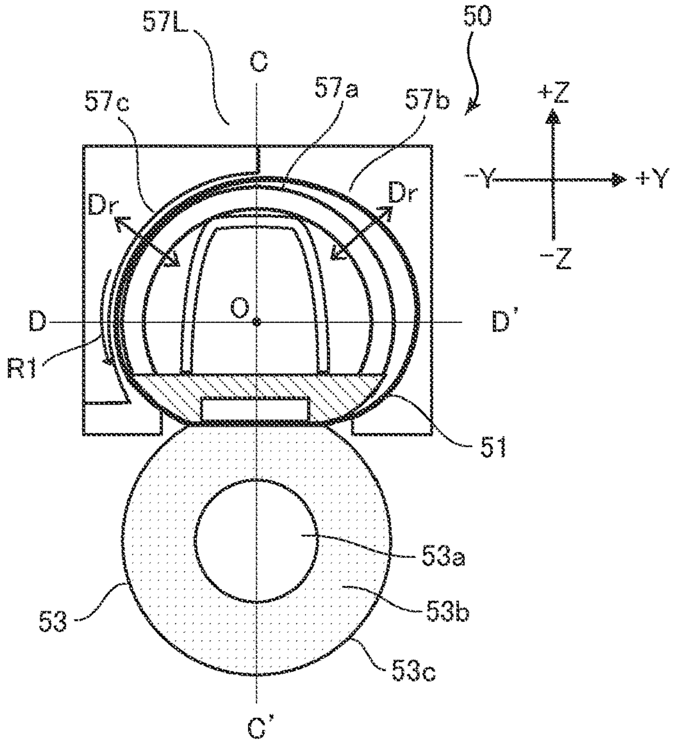

As illustrated in FIGS. 3A to 3C, the fixing unit 50 includes the tubular film 51, a nip forming member 52, the heater 54, the pressure roller 53, a stay 55, and flanges 57L and 57R. The nip forming member 52 and the heater 54 are arranged in an interior space of the film 51. The pressure roller 53 abuts against the nip forming member 52 and the heater 54 interposing the film 51, and the fixing nip Na is formed as a nip portion, i.e., contact area, between the film 51 and the pressure roller 53.

The film 51 is formed in an endless state using a film material, i.e., thin film, having flexibility. The film 51 is a fixing film for thermal fixing, i.e., heating rotary member. Polyimide or polyamide-imide may be used as the base layer of the film 51. In the present embodiment, polyimide is used as the base layer. An elastic layer made of silicone rubber and a surface layer, i.e., release layer, made of fluororesin (PFA) are formed on the base layer of the film 51. In the present embodiment, a thickness of the base layer is approximately 60 μm, a thickness of the elastic layer is approximately 180 μm, and a thickness of the surface layer is approximately 10 μm. The entire film thickness of the film 51 is approximately 250 μm. Grease is applied to an inner side, i.e., inner circumference surface, of the film 51. Thereby, frictional force generated between the inner surface of the film 51 and the nip forming member 52 and the heater 54 by rotation of the film 51 is reduced. In the present embodiment, a film composed of three layers, which are the base layer, the elastic layer, and the surface layer, was used, but the present technique is not limited thereto, and a film composed of two layers, which are the base layer and the surface layer, may also be used.

The film 51 is a member that rotates about a virtual rotational axis O (FIG. 3C) that extends in the X direction, i.e., longitudinal direction of the film 51. The rotational axis O of the film 51 according to the present embodiment is set to a center of a guide surface 57*a* described later having an approximately arc shape when viewed in the X direction. The rotational axis O is positioned at a center position of the fixing nip Na, i.e., line C-C' of FIG. 3C, hereinafter, short-side center Y0 of the fixing nip Na, in the Y direction, i.e., recording material conveyance direction.

Hereafter, a direction orthogonal to the X direction, i.e., longitudinal direction of the film 51, and that is a direction from the inner side toward the outer side of the tubular film 51, i.e., radial direction, is referred to as an "outer side in the radial direction" or "outer diameter side of the film 51". A direction orthogonal to the X direction, i.e., longitudinal direction of the film 51, and that is a direction from the outer side toward the inner side of the tubular film 51 is referred to as an "inner side in the radial direction" or "inner diameter side of the film 51". A radial direction Dr is a direction along a virtual straight line orthogonal to the rotational axis O of the film 51.

The pressure roller 53 is an example of a rotary member, i.e., pressing rotary member or pressing member, that forms a fixing nip with the film 51. The pressure roller 53 according to the present embodiment is composed of a core metal 53*a*, an elastic layer 53*b*, and a surface layer, or release layer, 53*c*. The elastic layer 53*b* is formed of silicone rubber. A fluororesin (PFA) tube is used as the surface layer 53*c*. Further, the core metal 53*a* has a diameter of 13 mm, on the outer circumference of which is formed the elastic layer 53*b* with a thickness of approximately 3.5 mm, and on which is formed the surface layer 53*c* with a thickness of approximately 40 μm.

The pressure roller 53 rotates about a rotational axis that extends in the X direction. That is, the pressure roller 53 is arranged to rotate about a rotational axis that is parallel to the rotational axis O of the film 51. The core metal 53*a* of the pressure roller 53 has both ends thereof in the X direction retained rotatably by a bearing disposed on the frame body of the fixing unit 50. Further, the pressure roller 53 includes an input gear 53*d* that receives driving force from a driving source, i.e., motor, and is driven to rotate during fixing of an image.

The nip forming member 52 is arranged on an inner diameter side of the film 51. The nip forming member 52 is arranged to be opposed to the pressure roller 53 in the Z direction interposing the film 51, and forms the fixing nip Na with the pressure roller 53. Further, the nip forming member 52 has a guiding function to guide a rotational track of the film 51 from the inner diameter side of the film 51 in the area between the flanges 57L and 57R described later in the X direction. The nip forming member 52 is formed of a material having stiffness, heat resisting property, and heat insulating property, such as liquid crystal polymer.

The heater 54 is an example of a heating unit that heats the film 51. The heater 54 according to the present embodiment is held by the nip forming member 52 and abuts against an inner surface of the film 51. That is, the nip forming member 52 functions as a holding member, i.e., heater holder, that holds the heater 54.

The heater 54 is a ceramic heater having a ceramic base plate, a heating layer, and a protecting layer. Alumina ($Al_2O_3$), aluminum nitride (AlN), zirconia ($ZrO_2$), or silicon carbide (SiC) may be used as the base plate. Among these materials, alumina ($Al_2O_3$) is inexpensive and readily available. Further, metal, which is superior from the viewpoint of stiffness, may be used as the base plate. Stainless steel (SUS) is superior from the viewpoint of both cost and stiffness, and it may be used preferably as a metal base plate. The heating layer is formed by patterning via screen printing, for example, and has a thickness of 10 μm and a width of 1 to 3 mm. Silver palladium may be used as the material of the heating layer. The protecting layer is formed to ensure insulation between the heating layer and the film 51, and it may be formed of glass.

Further, a sheet or plate-like heat uniformizing member may be interposed between the heater 54 and the inner surface of the film 51. The heat uniformizing member is formed of a material having high thermal conductivity, such as aluminum or stainless steel. The heating unit may not be held by the nip forming member 52. For example, the heater 54 may be arranged to be in contact with the inner surface or the outer surface of the film 51 at a position distant from the fixing nip Na. Even in a case where a halogen lamp or a coil is used as the heating unit, it may not be held by the nip forming member 52.

A thermistor 59 for detecting temperature of the heater 54 is arranged on a rear side of the heater 54, which is a side opposite to a contact surface that contacts the film 51 in the Z direction. The control unit of the image forming apparatus 100 controls power supply to the heater 54 based on a temperature detection signal of the thermistor 59, by which the temperature of the heater 54 is controlled.

The stay 55 is arranged on the inner diameter side of the film 51 and extends in the X direction. Flanges 57L and 57R are attached to both end portions of the stay 55 in the X direction. The stay 55 receives urging force in the −Z side via the flanges 57L and 57R from a pressurizing spring 56. The stay 55 abuts against the nip forming member 52 from the +Z side. The fixing nip Na is formed by having the nip forming member 52 and the heater 54 pressed against the pressure roller 53 via the stay 55. The stay 55 is a high stiffness member having a U-shaped cross-sectional shape (FIG. 3C) when viewed in the X direction, and is configured such that little deflection occurs even when the urging force in the −Z side of the pressurizing spring 56 and the reactive fore in the +Z side from the pressure roller 53 are received.

The flanges 57L and 57R are disposed as end portion regulating members that regulate end portions of the film 51 in the X direction. The flanges 57L and 57R regulate lateral shift of the film 51 in the X direction and also regulate the rotational track of the film 51 together with the nip forming member 52. The details of the flanges 57L and 57R will be described below.

When the fixing unit 50 performs fixing of an image, that is, when the image forming apparatus 100 executes the image forming operation, the pressure roller 53 is driven to rotate in a direction of rotation along the recording material conveyance direction. By having the pressure roller 53 rotate, the film 51 rotates following the rotation of the pressure roller 53 through frictional force received from the pressure roller 53 at the fixing nip Na. Further, by performing temperature control of the heater 54 based on the temperature detection result of the thermistor 59, the surface of the film 51 is heated to a predetermined target temperature, that is, fixing temperature.

When the recording material having passed through the secondary transfer portion is conveyed to the fixing unit 50, the fixing unit 50 nips the recording material between the film 51 and the pressure roller 53 at the fixing nip Na and conveys the recording material. The fixing unit 50 heats the unfixed image on the recording material by the film 51 being heated by heat conduction, i.e., non-radiant heat, from the heater 54 while conveying the recording material. Thereby, the unfixed image is fixed to the recording material.

End Portion Regulating Member

The shape of the flanges 57L and 57R according to the first embodiment will be described with reference to FIGS. 1A to 1C. In the present embodiment, the two flanges 57L and 57R have approximately the same shape, except that they are mutually reversed in the X direction. That is, the flanges 57L and 57R have a plane symmetric, i.e., symmetry of reflection, shape with a target surface set to a virtual plane perpendicular to the X direction and passing through a center position of the fixing nip Na, i.e., longitudinal center of the fixing nip Na, in the X direction. Therefore, in the following description, the flange 57L will be described, but the same description applies for the other flange 57R by reversing the positional relationship in the X direction.

Figure 1C:
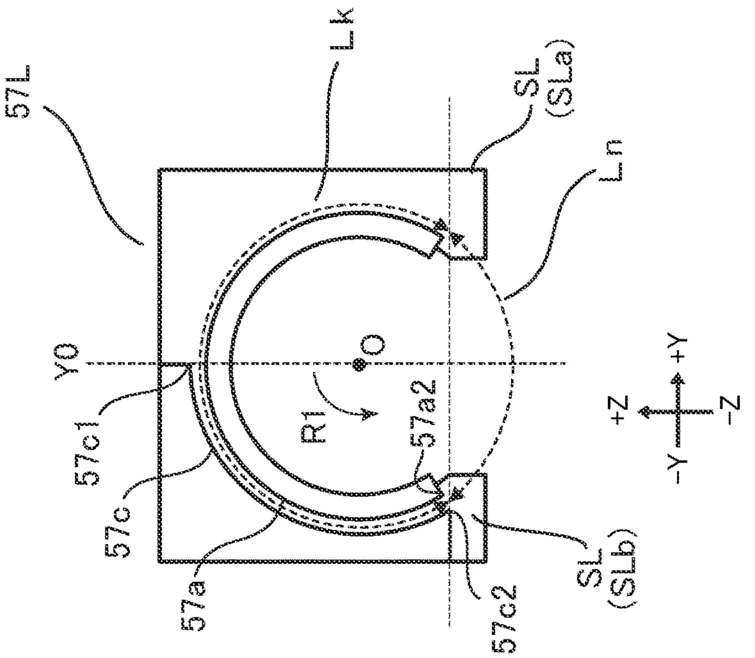
FIGS. 1A to 1C are each a view illustrating a configuration of a flange according to a first embodiment.
Figure 1B:
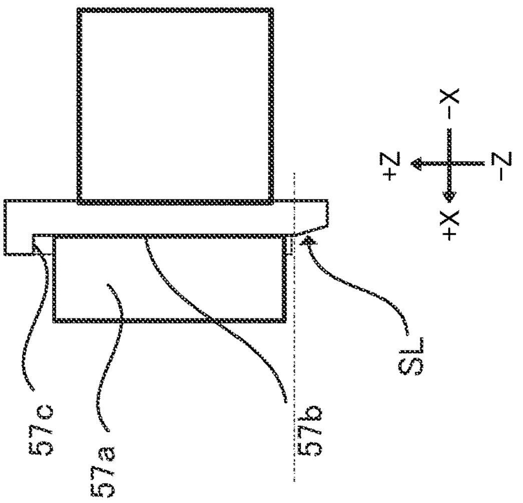
Figure 1A:
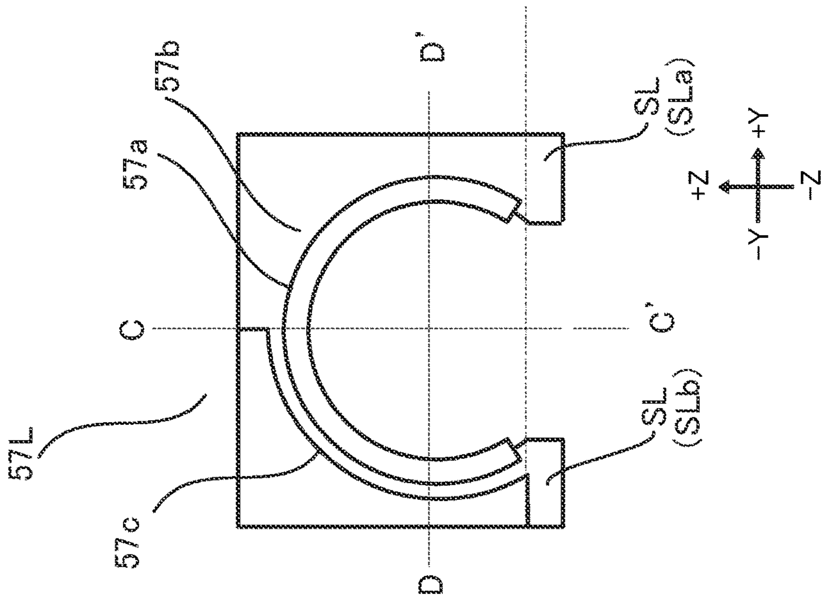

FIG. 1A is a view illustrating the flange 57L viewed from the center, i.e., from +X side, of the film 51 in the X direction. FIG. 1B is a view illustrating the flange 57 viewed from the downstream side, i.e., +Y side, in the recording material conveyance direction. FIG. 1C is a view of the flange 57L from the same direction as FIG. 1A, for illustrating the shape of the flange 57.

As illustrated in FIGS. 1A and 1B, the flange 57L includes the guide surface 57*a*, a side end regulating surface 576, and a deformation regulating surface 57*c*.

The guide surface 57*a* is an example of a first surface that faces the inner surface of the film 51. The guide surface 57*a* is in sliding contact with the inner surface at an end portion of the film 51. By supporting the inner surface of the film 51, the guide surface 57*a* has a function to regulate the rotational track of the film 51 together with the nip forming member 52.

The guide surface 57*a* of the present embodiment is approximately arc-shaped, i.e., cylindrical surface-shaped, about the rotational axis O of the film 51 viewed from the X direction, and it is a surface that extends toward the center, i.e., toward +X side, of the film 51 in the X direction from the side end regulating surface 57*b*. The guide surface 57*a* is approximately perpendicular to the side end regulating surface 57*b* at respective positions on the border between the side end regulating surface 57*b*.

The side end regulating surface 57*b* is an example of a second surface that faces the end face of the film 51 in the X direction, i.e., longitudinal direction of the film 51. The side end regulating surface 57*b* regulates movement, i.e., lateral shift, of the film 51 in the X direction. The side end regulating surface 57*b* is a surface that intersects the X direction. In the present embodiment, at least a portion of the side end regulating surface 57*b*, i.e., area excluding a sloped portion SL described later, has a perpendicular planar shape with respect to the X direction.

FIG. 1C illustrates a range in which the side end regulating surface 57*b* is provided. Regarding a direction of rotation R1 in which the film 51 rotates about the rotational axis O, a range Lk is a range in which the side end regulating surface 57*b* is provided, and a range Ln is a range in which the side end regulating surface 57*b* is not provided. The range Lk covers approximately an entire circumference of the film 51 excluding the portion of the film 51 positioned at the fixing nip Na when viewed in the X direction.

The side end regulating surface 57*b* has sloped portions SL provided at two parts adjacent to the range Lk where the side end regulating surface 57*b* is not provided with the range Ln where the side end regulating surface 57*b* is provided. In the side end regulating surface 57*b*, the sloped portions SL are a part that faces an end face of a part of the film 51 having immediately exited from the fixing nip Na and a part that faces an end face of a part of the film 51 immediately before entering the fixing nip Na.

Each sloped portion SL is inclined with respect to the virtual plane perpendicular to the X direction such that it separates from the film 51 in the X direction toward the fixing nip Na in the direction of rotation R1 of the film 51. In other words, a sloped portion SLa positioned on the downstream side, i.e., +Y side, in the recording material conveyance direction with respect to the fixing nip Na is inclined toward a side separating from the film 51 in the X direction, i.e., −X side, toward the upstream side in the direction of rotation R1 of the film 51. A sloped portion SLb positioned on the upstream side, i.e., +Y side, in the recording material conveyance direction with respect to the fixing nip Na is inclined toward a side separating from the film 51 in the X direction, i.e., −X side, toward the downstream side in the direction of rotation R1 of the film 51.

By providing such sloped portions SL, in a state where the end face of the film 51 comes into contact with the side end regulating surface 57*b*, the end face is prevented from being in strong contact with a circumference of the side end regulating surface 57*b*. That is, the portion of the film 51 that has immediately exited the fixing nip Na comes into contact gradually with the sloped portion SLa. The portion of the end face of the film 51 immediately before entering the fixing nip Na gradually separates from the sloped portion SLb. Thereby, the film 51 may rotate more smoothly.

The deformation regulating surface 57*c* is an example of a third surface that faces an outer surface of the film 51 and that regulates the end portion of the film 51 from being deformed toward the outer diameter side of the film 51. The deformation regulating surface 57*c* is formed to extend to the center side, i.e., +X side, of the film 51 in the X direction from the side end regulating surface 57*b*. The deformation regulating surface 57*c* according to the present embodiment is formed in parallel with the guide surface 57*a*. Further, the deformation regulating surface 57*c* of the present embodiment is perpendicular to the side end regulating surface 57*b*.

A protruded length in the X direction of the deformation regulating surface 57*c* with respect to the side end regulating surface 57*b* is set to 500 μm, for example. A protruded length in the X direction of the deformation regulating surface 57*c* with respect to the side end regulating surface 57*b* is shorter than the protruded length in the X direction of the guide surface 57*a* with respect to the side end regulating surface 57*b*. In other words, the protruded length of the third surface in the longitudinal direction, i.e., X direction, with respect to the second surface is shorter than the protruded length of the first surface in the longitudinal direction with respect to the second surface. In order for the guide surface 57*a* to support the inner surface of the film 51 stably, it is preferable for the width of the guide surface 57*a* in the X direction to have a certain width. In contrast, the deformation regulating surface 57*c* is only required to regulate deformation of the end portion of the film 51, such that the width thereof in the X direction may be narrower than the guide surface 57*a*.

The deformation regulating surface 57*c* faces the guide surface 57*a* in the radial direction Dr. In other words, the flange 57L according to the present embodiment includes the guide surface 57*a* that protrudes from the side end regulating surface 57*b* in the X direction at the inner diameter side of the film 51 and the deformation regulating surface 57*c* that protrudes from the side end regulating surface 57*b* in the X direction at the outer diameter side of the film 51. The end portion of the film 51 is regulated so as to pass through the space between the deformation regulating surface 57*c* and the guide surface 57*a* in the radial direction Dr. Thereby, the deformation of the end portion of the film 51 in the radial direction Dr may be regulated.

In the present embodiment, the distance between the deformation regulating surface 57*c* and the guide surface 57*a* in the radial direction Dr is set to be approximately fixed across the entire area in which the deformation regulating surface 57*c* is provided. The distance between the deformation regulating surface 57*c* and the guide surface 57*a* is preferably greater than a film thickness of the film 51 and equal to or smaller than four times the film thickness of the film 51. The film thickness of the film 51 according to the present embodiment is approximately 250 μm, and in this case, the distance between the deformation regulating surface 57*c* and the guide surface 57*a* is preferably 500 μm.

Further according to the present embodiment, the deformation regulating surface 57*c* is provided on the upstream side, i.e., −Y side, with respect to the short-side center Y0 of the fixing nip Na in the Y direction, i.e., recording material conveyance direction. That is, the entire area of the deformation regulating surface 57*c* is positioned either at the same range as the short-side center Y0 of the fixing nip Na in the Y direction or on the upstream side, i.e., −Y side, in the recording material conveyance direction. As illustrated in FIG. 3C, a starting end 57*c*1 of the deformation regulating surface 57*c* in the direction of rotation R1 of the film 51 is positioned approximately on the short-side center Y0 of the fixing nip Na in the Y direction. Further, a position of a terminal end 57*c*2 of the deformation regulating surface 57*c* in the direction of rotation R1 of the film 51 approximately coincides with a terminal end 57*a*2 of the guide surface 57*a* in the direction of rotation R1 of the film 51.

Lateral Shift Force Acting on Film

Figure 4:
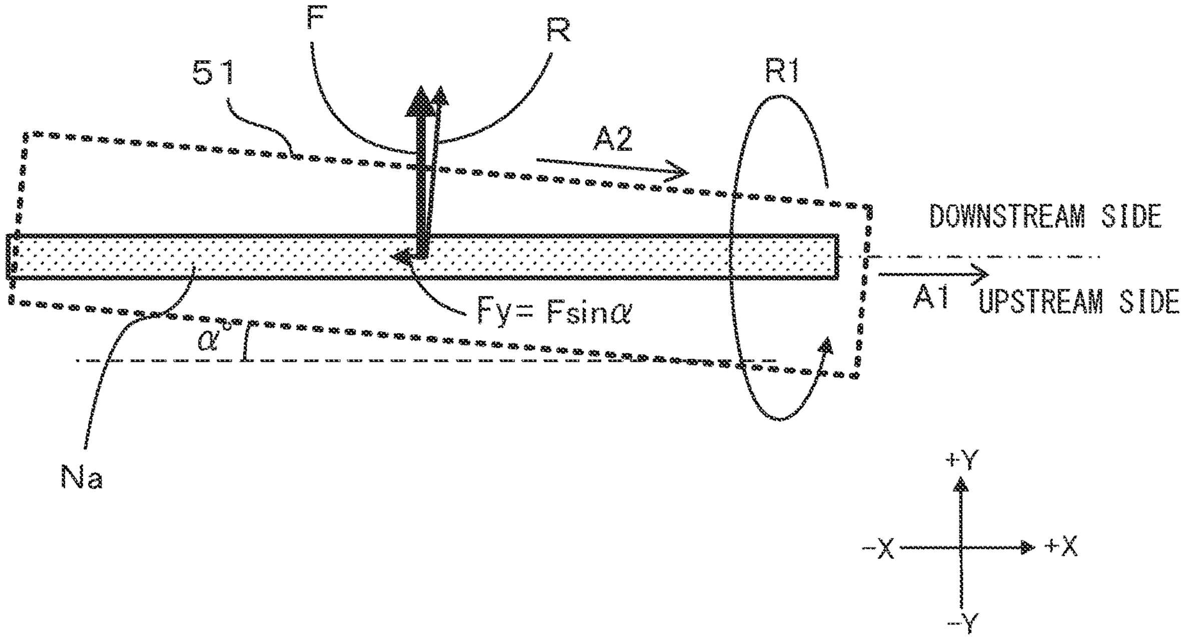
FIG. 4 is a view illustrating a mechanism of occurrence of lateral shift of a film.

A mechanism of occurrence of lateral shift force that acts on the film 51 will be described with reference to FIG. 4. FIG. 4 is a view schematically illustrating a positional relationship between the film 51 and the fixing nip Na when the fixing unit 50 is viewed from the +Z side.

As illustrated in FIG. 4, a case is considered where a longitudinal direction A1 of the film 51 is inclined by an angle α to a rotational axis direction A2 of the pressure roller 53. The film 51 is wound loosely around the nip forming member 52, and it is rotated in the direction of rotation R1 along with the rotation of the pressure roller 53. The force, i.e., frictional force, that the film 51 receives from the pressure roller 53 at the fixing nip Na is referred to as a driving force F. Regarding the driving force F, a component of a direction perpendicular to the longitudinal direction A1 of the film 51 serves as a rotating force R that rotates the film 51 in the direction of rotation R1. Regarding the driving force F, a component in a direction perpendicular to the longitudinal direction A1 of the film 51 serves as a lateral shift force Fy that causes lateral shift of the film 51 in the X direction. A size of the lateral shift force Fy may be referred to as Y=F sin α.

As described, one cause of occurrence of the lateral shift force Fy is the inclination of the film 51. The inclination of the film 51 may be caused by manufacture tolerance of components of the fixing unit 50 or by inclination tolerance, or misalignment, during assembly, such that it is difficult to completely eliminate inclination of the film 51.

In a state where the film 51 is shifted laterally by the lateral shift force Fy and the end face of the film 51 abuts against the side end regulating surface 57*b* of the flange 57L, the film 51 receives reactive force from the flange 57L. If the reactive force is strong, the film 51 may be deformed greatly.

Depending on the positional tolerance of the flange 57L or the level of inclination tolerance, the reactive force that the film 51 receives from the side end regulating surface 57*b* of the flange 57L by the lateral shift force Fy is often relatively strong at the upstream side and relatively small at the downstream side in the recording material conveyance direction.

Further, in a case where the longitudinal direction A1 of the film 51 is inclined as illustrated in FIG. 4, at the end portion of the film 51, that is, the end portion that abuts against the side end regulating surface 57*b* by lateral shift, the inner surface of the film 51 approaches or comes into strong contact with the guide surface 57*a* at the upstream side in the recording material conveyance direction. Meanwhile, the inner surface of the film 51 often separates from the guide surface 57*a* at the upstream side, i.e., +Y side, in the recording material conveyance direction.

Figure 5A:
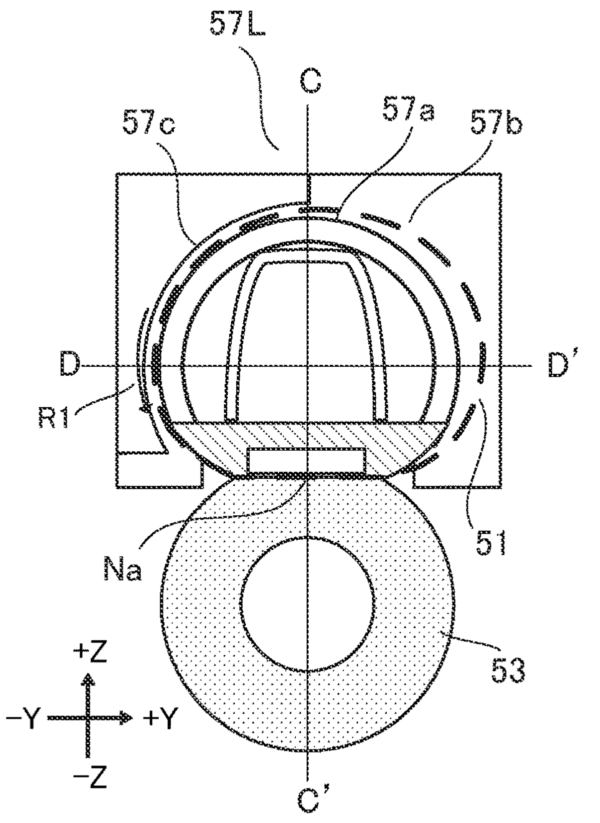
FIGS. 5A to 5C are each a view illustrating a configuration of the flange according to the first embodiment.
Figure 5B:
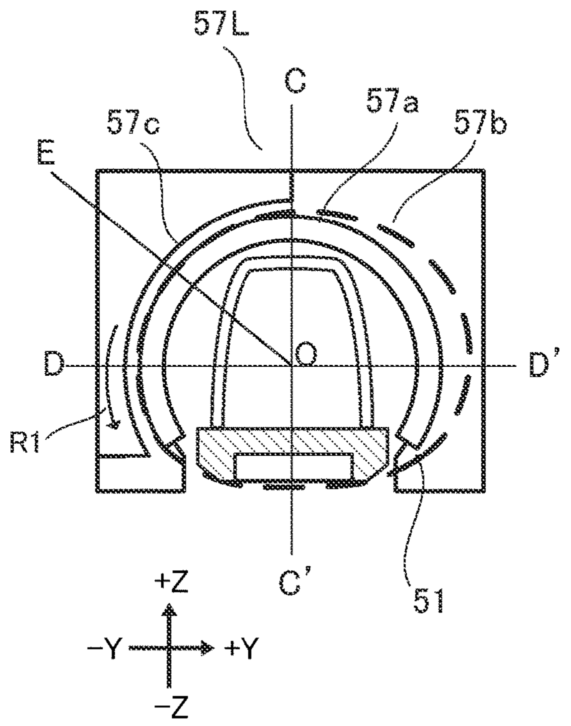
Figure 5C:
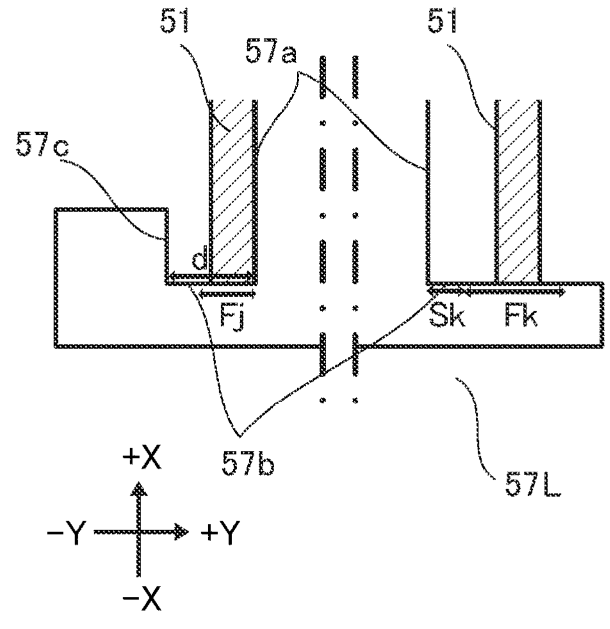

With reference to FIGS. 5A to 5C, the operation of the deformation regulating surface 57*c* of the flange 57L will be described. FIG. 5A is a cross-sectional view of the fixing unit 50 taken at line A-A' of FIG. 3A. FIG. 5B is a cross-sectional view of the fixing unit 50 taken at line B-B' of FIG. 3A. FIG. 5C is a cross-sectional view of the fixing unit 50 taken at line D-D' of FIG. 5A, that is, an XY plane passing through the rotational axis O, with a center portion in the Y direction not shown. The rotational tracks of the film 51 illustrated in FIGS. 5A to 5C are merely an example. Further, among FIGS. 5A to 5C, FIG. 5B illustrates a rotational track of the film 51 in a state where the end portion of the film 51 is abutted against the side end regulating surface 576 of the flange 57L by lateral shift of the film 51.

As illustrated in FIG. 3A, the area where the nip forming member 52 and the pressure roller 53 abut against one another interposing the film 51 is the area of the fixing nip Na in the X direction. Meanwhile, the pressure roller 53 is not present near the flanges 57L and 57R, and the fixing nip Na is not formed. The range on the inner side of the side end regulating surface 57*b* of the flanges 57L and 57R in the X direction and that is outside the area of the fixing nip Na in the X direction is referred to as an out-of-nip range Nb. FIG. 5A illustrates a cross-section of the fixing unit 50 within the area of the fixing nip Na, and FIG. 5B illustrates a cross-section of the fixing unit 50 in the out-of-nip range Nb.

As illustrated in FIG. 5A, in the fixing nip Na, the film 51 receives the driving force F from the pressure roller 53 accompanying the rotation of the pressure roller 53. Thereby, the film 51 is drawn toward the fixing nip Na by the pressure roller 53 on the upstream side, i.e., −Y side, in the recording material conveyance direction. On the contrary, the film 51 is pushed out of the fixing nip Na by the pressure roller 53 on the downstream side, i.e., +Y side, in the recording material conveyance direction.

Therefore, the rotational track of the film 51 is shifted toward the downstream side, i.e., +Y side, in the recording material conveyance direction with respect to the short-side center Y0 of the fixing nip Na. That is, the film 51 has an eccentric shape where the film 51 approaches the short-side center Y0 of the fixing nip Na at the upstream side, i.e., −Y side, in the recording material conveyance direction and where it recedes from the short-side center Y0 of the fixing nip Na at the downstream side, i.e., +Y side, in the recording material conveyance direction. In the −Z side, i.e., the side having the pressure roller 53, of the rotational axis O, the film 51 passes through the fixing nip Na, such that the rotational track of the film 51 is approximately parallel to the recording material conveyance direction.

In the out-of-nip range Nb, the pressure roller 53 is not present. However, the film 51 has a certain level of stiffness, and it tends to retain the same shape as the film of the adjacent range in the X direction. Therefore, even in the out-of-nip range Nb, the film 51 forms a rotational track that is close to the rotational track of the film 51 within the area of the fixing nip Na.

That is, as illustrated by the broken line in FIG. 5B, even in the out-of-nip range Nb, the rotational track of the film 51 has a shape shifted toward the downstream side, i.e., +Y side, in the recording material conveyance direction with respect to the short-side center Y0 of the fixing nip Na. That is, the film 51 has an eccentric shape where the film 51 approaches the short-side center Y0 of the fixing nip Na at the upstream side, i.e., −Y side, in the recording material conveyance direction and where it recedes from the short-side center Y0 of the fixing nip Na at the downstream side, i.e., +Y side, in the recording material conveyance direction. In the −Z side, i.e., the side having the pressure roller 53, of the rotational axis O, the rotational track of the film 51 is approximately parallel to the recording material conveyance direction.

As described earlier, in a case where the lateral shift of the film 51 toward the direction approaching the flange 57L, i.e., −X side, occurs, a tendency in which the rotational track of the film 51 is shifted to the downstream side, i.e., +Y side, in the recording material conveyance direction may become more significant.

As described above, the guide surface 57*a* is not in contact across its entire area with the film 51, and a gap is formed between the inner surface of the film 51 and the range of a part of the guide surface 57*a*, which is mainly the range on the downstream side in the recording material conveyance direction. That is, the guide surface 57*a* is configured such that a circumference of a shortest path passing the guide surface 57*a* and the fixing nip Na is shorter than a circumference of the inner surface of the film 51.

If the gap between the guide surface 57*a* and the film 51 is to be completely eliminated, dispersion of circumference formed during manufacture of the film 51 or the dimensional tolerance during manufacture of the flange 57L may cause the film 51 to slide strongly against the flange 57L, and the inner surface of the film 51 may be worn. If the circumference of the film 51 is too small compared to the flange 57L, the film 51 may not be assembled to the flange 57L. In the present embodiment, the circumference of the inner surface of the film 51 is provided with a margin with respect to the circumference of the shortest path passing through the guide surface 57*a* and the fixing nip Na, such that the above-mentioned problems may be avoided.

With reference to FIG. 5C, the positional relationship between the rotating film 51 and the flange 57 will be described further. The left side of FIG. 5C is the upstream side, i.e., −Y side, in the recording material conveyance direction, and the right side is the downstream side, i.e., +Y side, in the recording material conveyance direction.

In FIG. 5C, a presence range Fj represents an area in the Y direction where the rotating film 51 is present, that is, area including the positional variation of the film 51 during rotation, on the upstream side, i.e., −Y side, in the recording material conveyance direction. A presence range Fk represents an area in the Y direction where the rotating film 51 is present, that is, area including the positional variation of the film 51 during rotation, on the downstream side, i.e., +Y side, in the recording material conveyance direction. A gap range Sk represents an area where a gap is formed between the guide surface 57*a* and the presence range Fk of the film 51 on the downstream side, i.e., +Y side, in the recording material conveyance direction. Further, on the upstream side, i.e., −Y side, in the recording material conveyance direction, the presence range Fj of the film 51 is adjacent to the guide surface 57*a*, such that there is no gap range.

According to the present embodiment, the presence range Fj of the film 51 on the upstream side, i.e., −Y side, in the recording material conveyance direction was approximately 270 μm, which is somewhat greater than the film thickness from the guide surface 57*a* to the film 51, i.e., 250 μm. The gap range Sk on the downstream side, i.e., +Y side, in the recording material conveyance direction was approximately 50 μm, and the presence range Fk of the film 51 was approximately 350 μm. However, the specific size of the respective ranges Fj, Fk, and Sk may be varied according to conditions such as the film thickness, the stiffness, and the rotational speed of the film 51.

As described, the presence range Fk of the film 51 on the downstream side, i.e., +Y side, in the recording material conveyance direction tends to be greater than the presence range Fj of the film 51 on the upstream side, i.e., −Y side, in the recording material conveyance direction. This is because the rotational track may be varied on the downstream side due to the manufacture tolerance of the inner diameter of the film 51, while the film 51 is pressed against the guide surface 57*a* of the flange 57L on the upstream side.

Figure 6:
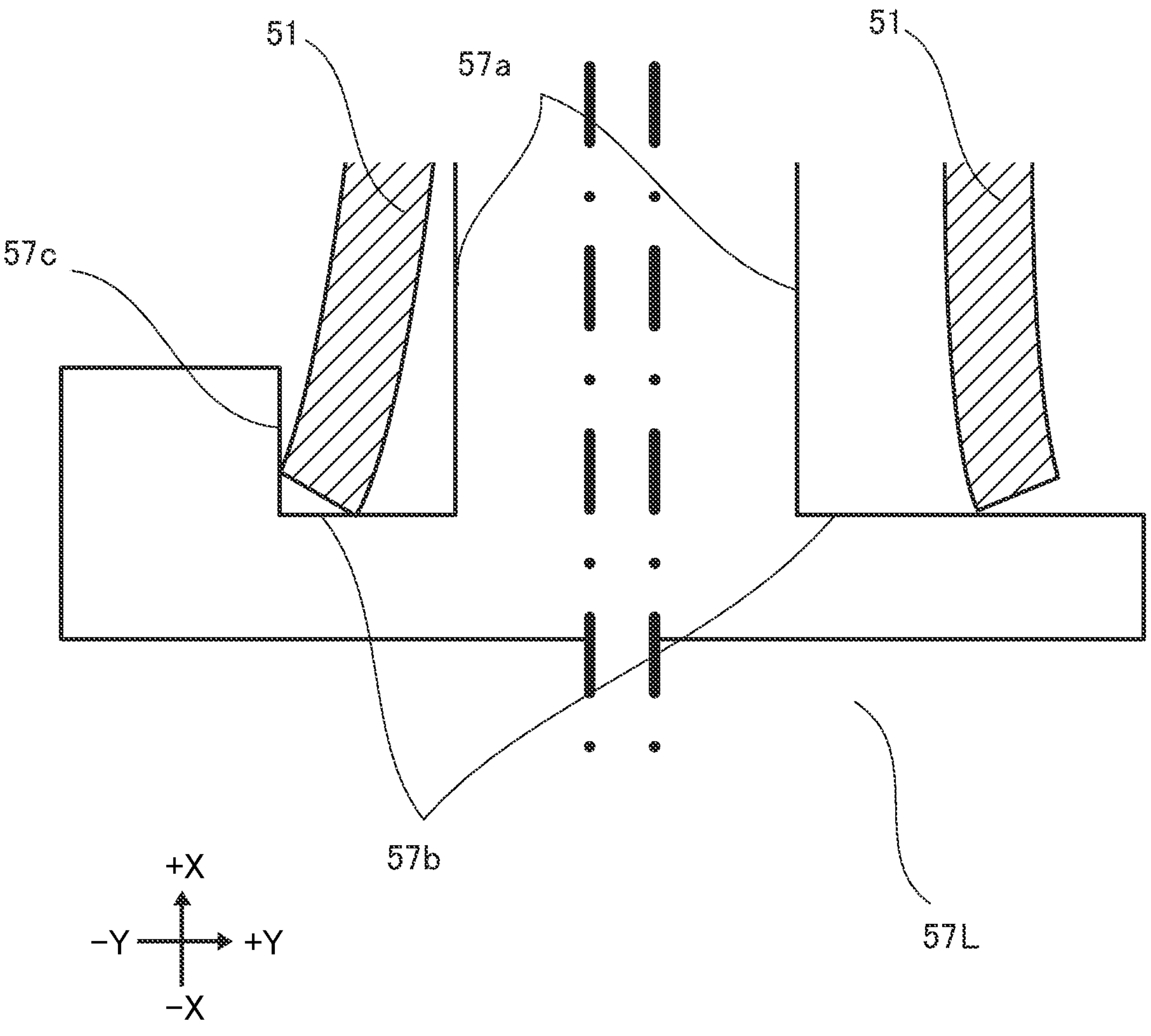
FIG. 6 is a view illustrating a function of a deformation regulating surface according to the first embodiment.

FIG. 6 is a cross-sectional view of the fixing unit 50 taken at line D-D' of FIG. 5B. Compared to the cross-section of FIG. 5C corresponding to FIG. 5A, the film 51 is pressed strongly against the side end regulating surface 57*b* of the flange 57 by lateral shift force. That is, compressive force acts on the end portion of the film 51 by lateral shift force toward the −X side and reactive force from the side end regulating surface 57*b* toward the +X side.

As described earlier with reference to FIG. 5C, on the upstream side, i.e., −Y side, in the recording material conveyance direction, the film 51 is in contact with the guide surface 57*a*, such that the film 51 will not easily deform toward the inner diameter side. Therefore, if the lateral shift force becomes stronger from the state illustrated in FIG. 5C, the film 51 will gradually deform toward the outer diameter side of the film 51 from its end portion, as illustrated in FIG. 6.

If the deformation regulating surface 57*c* is not present, when lateral shift force becomes strong, the film 51 will deform excessively beyond its range of elastic deformation, and damages such as folding and bending of the film 51 may occur.

In contrast, the flange 57 according to the present embodiment is provided with the deformation regulating surface 57*c*, such that by regulating the end portion of the film 51 from being deformed toward the outer diameter side of the film 51, the possibility of occurrence of damages such as the folding and bending of the film 51 may be reduced.

Specifically, the deformation regulating surface 57*c* regulates the end portion of the film 51 from being deformed toward the outer diameter side of the film 51 by coming into contact with the film 51 at the upstream side, i.e., −Y side, in the recording material conveyance direction. As described earlier, the reactive force that the film 51 receives from the side end regulating surface 57*b* of the flange 57L tends to be greater on the upstream side, i.e., −Y side, in the recording material conveyance direction than the downstream side, i.e., +Y side, in the recording material conveyance direction. Therefore, a deformation quantity of the end portion of the film 51 toward the outer diameter side of the film 51 tends to be greater on the upstream side, i.e., −Y side, in the recording material conveyance direction compared to the downstream side, i.e., +Y side, in the recording material conveyance direction. If the deformation quantity of the end portion of the film 51 reaches a certain magnitude at the upstream side, i.e., −Y side, in the recording material conveyance direction, the film 51 comes into contact with the deformation regulating surface 57*c* and receives reactive force in the inner diameter side of the film 51 from the deformation regulating surface 57*c*. Thereby, on the upstream side, i.e., −Y side, in the recording material conveyance direction, the end portion of the film 51 is regulated from deforming toward the outer diameter side of the film 51 beyond the deformation regulating surface 57*c*.

Experiment Result

Results of experiments performed to confirm whether the occurrence of folding and bending of the end portion of the film 51 varies by the presence or absence of the deformation regulating surface 57*c* will be described. In the present experiment, in order to perform verification in a short time, excessive load was applied to the film 51 for evaluation. The procedure of the experiment will be described hereafter. At first, a fixing unit, having configurations A and B, in which an inclination a of the longitudinal direction A1 of the film 51 with respect to the rotational axis direction A2 of the pressure roller 53 (FIG. 4) is set to a greater value than the range that is normally permitted in the fixing unit was prepared, such that a strong lateral shift force is intentionally set to act on the film 51. In the present experiment, the lateral force applied to the film 51 was approximately 2.0 kgf, that is, approximately 20 N. Configuration A adopts the configuration illustrated in the present embodiment, and the flange 57L is provided with the deformation regulating surface 57*c*. Configuration B is a comparative example, wherein the flange 57L is not provided with the deformation regulating surface 57*c*, in other words, the side end regulating surface 57*b* is also extended to the upstream side in the recording material conveyance direction. After passing 1000 sheets of recording material through the two kinds of fixing units respectively having configurations A and B, whether folding or bending has occurred to the end portion of the film 51 was confirmed.

According to configuration A provided with the deformation regulating surface 57*c*, i.e., first embodiment, no folding or bending has occurred to the end portion of the film 51. Meanwhile, according to configuration B not provided with the deformation regulating surface 57*c*, i.e., comparative example, folding and bending of the end portion of the film 51 has occurred.

Therefore, it was confirmed that according to the present embodiment, the possibility of damages such as folding and bending occurring to the end portion of the film 51 may be reduced.

In order to suppress the damaging of the film 51 more effectively, it is preferable for the deformation regulating surface 57*c* to be in contact with the film 51 in a state where the deformation quantity of the end portion of the film 51 is within the range of elastic deformation. Alternatively, the deformation regulating surface 57*c* may be caused to be in contact with the film 51 in a state where the deformation quantity of the end portion of the film 51 is within a plastic deformation range but with a small difference from the upper limit of the elastic deformation range.

The elastic deformation range of the film 51 may vary according to the material of the various layers of the film 51 or the thickness of each layer of the film 51 and the entire film thickness of the film 51, but it is preferable for the distance between the guide surface 57*a* and the deformation regulating surface 57*c* to be four times the film thickness of the film 51 or less. If the distance between the guide surface 57*a* and the deformation regulating surface 57*c* is equal to or smaller than the above value at least in a part of the range on the upstream side, i.e., −Y side, in the recording material conveyance direction, it was confirmed that the folding or bending of the film 51 may generally be suppressed. However, the distance between the guide surface 57*a* and the deformation regulating surface 57*c* may be varied arbitrarily according to the specific configuration of the fixing unit 50.

Further according to the present embodiment, the entire body of the deformation regulating surface 57*c* is arranged on the upstream side, i.e., −Y side, in the recording material conveyance direction with respect to the short-side center Y0 of the fixing nip Na, and the deformation regulating surface 57*c* is not provided on the downstream side, i.e., +Y side, in the recording material conveyance direction. That is, the flange 57L, i.e., end portion regulating member, allows the end portion of the film 51 to be deformed in a manner separating from the guide surface 57*a*, i.e., first surface, on the downstream side of the center position, i.e., short-side center Y0, of the fixing nip Na in the recording material conveyance direction. There are three reasons for adopting this configuration, as described below.

As described above, the first reason is that the lateral shift force acting on the film 51 on the downstream side, i.e., +Y side, is small compared to the upstream side, i.e., −Y side, in the recording material conveyance direction, such that the necessity to regulate deformation of the end portion of the film 51 is relatively low. The second reason is that since the film 51 has a certain level of stiffness, if the deformation of the film 51 toward the outer diameter side is regulated on the upstream side, i.e., −Y side, in the recording material conveyance direction, the deformation of the film 51 toward the outer diameter side is also regulated on the downstream side, i.e., +Y side. The third reason is to avoid the possibility of the film 51 coming into strong contact with the deformation regulating surface 57*c* on the downstream side, i.e., +Y side, by which the film 51 may deform toward the inner diameter side, if the deformation regulating surface 57*c* is arranged also on the downstream side, i.e., +Y side, in the recording material conveyance direction. This is because, as described above, the presence range Fk (FIG. 5C) of the film 51 tends to be widened on the downstream side, i.e., +Y side, compared to the upstream side, i.e., −Y side, in the recording material conveyance direction.

If the three drawbacks described above do not occur or when they are permissible, the deformation regulating surface 57*c* may also be arranged on the downstream side, i.e., +Y side, in addition to the upstream side, i.e., −Y side, in the recording material conveyance direction. For example, even if the starting end 57*c*1 (FIG. 1C) of the deformation regulating surface 57*c* according to the first embodiment is extended toward the downstream side, i.e., +Y side, in the recording material conveyance direction to an extremely short distance than the short-side center Y0 of the fixing nip Na, the above-mentioned drawbacks do not occur.

As described above, according to the configuration of the present embodiment, the possibility of occurrence of damages to the film may be reduced.

According to the present embodiment, a configuration adopting the heater 54 serving as a ceramic heater as the heating unit had been illustrated, but the heating unit is not limited to the heater 54. For example, a heat source such as a halogen lamp that heats the film 51 by radiant heat or a coil serving as an induction heating unit that heats the film 51 by supplying a circulating current to a conducting layer provided on the film 51 through electromagnetic induction may also be used.

Further according to the present embodiment, the distance between the deformation regulating surface 57*c* and the guide surface 57*a* in the radial direction Dr is fixed across the entire area of the deformation regulating surface 57*c*, but the distance between the deformation regulating surface 57*c* and the guide surface 57*a* may also be varied. In that case, the distance between the deformation regulating surface 57*c* and the guide surface 57*a* at the shortest distance area should preferably be four times the film thickness of the film 51 or less.

Figure 5D:
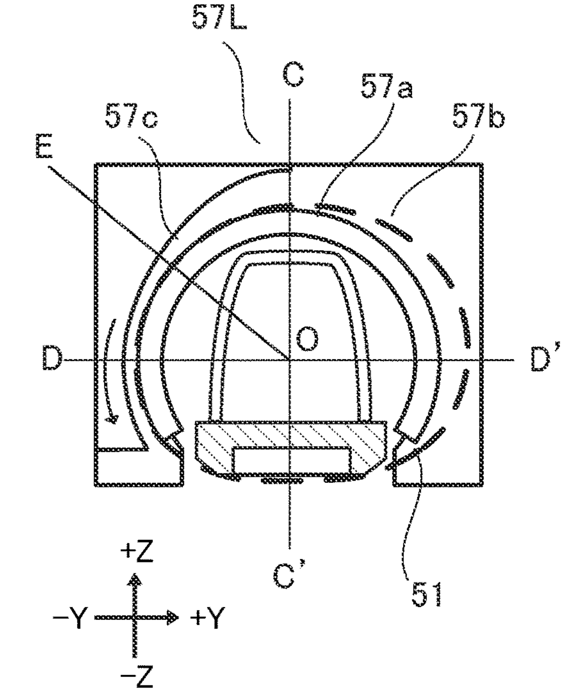
FIG. 5D is a view illustrating a flange according to a modified example.

FIG. 5D is a view illustrating a modified example in which the distance between the deformation regulating surface 57*c* and the guide surface 57*a* is varied depending on a position, i.e., rotation angle, of the film 51 in the direction of rotation R1. In the configuration example, the distance between the deformation regulating surface 57*c* and the guide surface 57*a* in the radial direction Dr is 1000 μm on line O-C, i.e., starting end position of the deformation regulating surface 57*c,* 700 μm on line O-E, and 500 μm on line O-D, i.e., terminal end position of the deformation regulating surface 57*c*. Further, the deformation regulating surface 57*c* is formed such that the distance between the deformation regulating surface 57*c* and the guide surface 57*a* is varied continuously and smoothly with respect to the direction of rotation R1 of the film 51 from the starting end position to the terminal end position of the deformation regulating surface 57*c*.

Even according to this modified example, the distance between the deformation regulating surface 57*c* and the guide surface 57*a* is set to an appropriate length at a part of the deformation regulating surface 57*c*, such that deformation of the end portion of the film 51 may be regulated, and the possibility of occurrence of film damage may be reduced.

First Modified Example

A configuration of a modified example of the first embodiment will be described below. Unless denoted otherwise, the components denoted with the same reference numbers as the first embodiment have approximately the same configurations and functions as those described in the first embodiment, such that the parts that differ from the first embodiment are mainly described.

According to the present modified example, the distance between a first surface and a third surface at a starting end side, i.e., inlet portion, and at a terminal end side, i.e., outlet portion, of the third surface of an end portion regulating member in the direction of rotation of the film is greater than the distance at a center portion of the third surface.

Figure 7B:
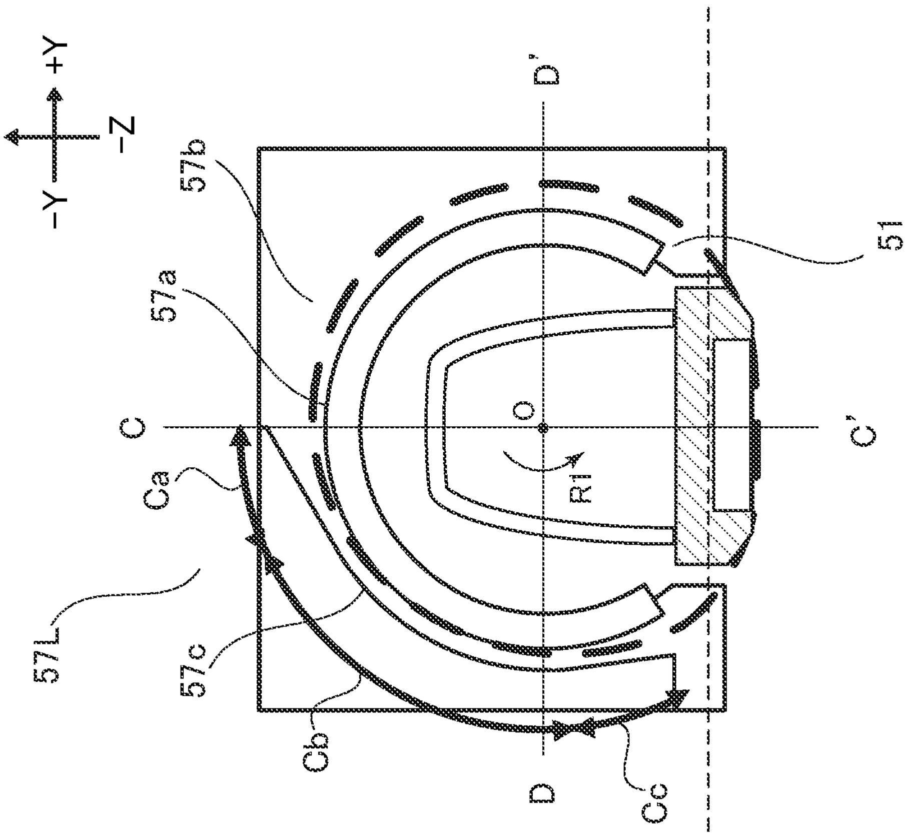
FIGS. 7A and 7B are each a view illustrating a configuration of a flange according to a first modified example.
Figure 7A:
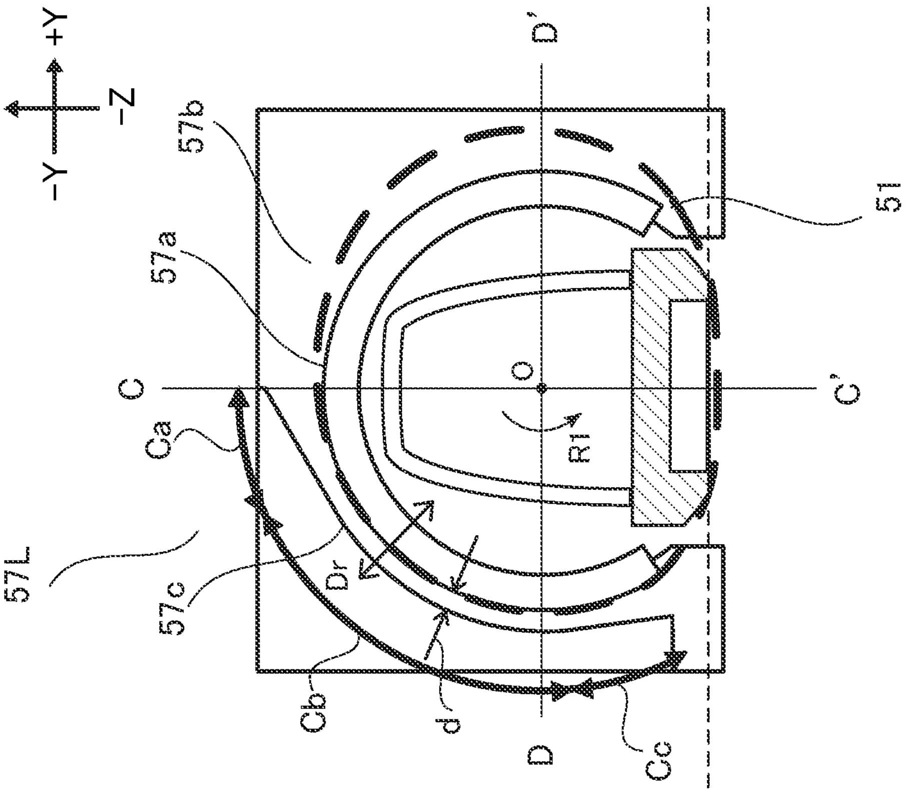

A detailed configuration of a first modified example will be described with reference to FIGS. 7A and 7B. FIG. 7A is a view illustrating a configuration of the flange 57L according to a first modified example. FIG. 7B is a view illustrating a case where the distance between the flange 57L and the fixing nip Na has become great compared to FIG. 7A due to the manufacture tolerance or the assembly tolerance of components in the first modified example.

The deformation regulating surface 57*c* serving as a third surface is disposed in the range on the upstream side, i.e., −Y side, in the recording material conveyance direction than the short-side center Y0, i.e., line C-C', of the fixing nip Na in the guide surface 57*a* serving as a first surface, similar to the first embodiment. A portion including a starting end of the deformation regulating surface 57*c* in the direction of rotation R1 is referred to as an inlet portion Ca. A portion including a terminal end of the deformation regulating surface 57*c* in the direction of rotation R1 is referred to as an outlet portion Cc. The range between the inlet portion Ca and the outlet portion Cc is referred to as a center portion Cb.

In the first modified example, as described below, a distance d between the deformation regulating surface 57*c* and the guide surface 57*a* in the radial direction Dr is varied according to the position of the direction of rotation R1 of the film 51. At the inlet portion Ca, the distance d is reduced toward the downstream side in the direction of rotation R1. At the center portion Cb, the distance d is fixed, and it is set to 500 μm, similar to the first embodiment. At the outlet portion Cc, the distance d is increased toward the downstream side in the direction of rotation R1.

Since the distance d at the center portion Cb is set small, similar to the first embodiment, the deformation regulating surface 57*c* may regulate the end portion of the film 51 abutted against the side end regulating surface 57*b* by lateral shift force from being deformed toward the outer diameter side of the film 51.

In the inlet portion Ca, there are cases where the inner surface of the film 51 is separated from the side end regulating surface 57*b*, or where a gap is formed between the film 51 and the guide surface 57*a* compared to the center portion Cb, specifically, the position on line O-D on the most upstream side in the recording material conveyance direction. Therefore, in the inlet portion Ca, the distance d between the deformation regulating surface 57*c* and the guide surface 57*a* is set to be increased toward the starting end of the deformation regulating surface 57*c*, such that the outer surface of the film 51 may be prevented from being slid strongly against the deformation regulating surface 57*c* at the inlet portion Ca. Thereby, the possibility of the film 51 being deformed toward the inner diameter side of the film 51 by the force that the film 51 receives from the deformation regulating surface 57*c* in the inlet portion Ca may be reduced.

Further, depending on the dimension tolerance of the components or the dispersion of pressing force of the pressurizing spring 56 (FIG. 3A), the position of the fixing nip Na in the Z direction with respect to the flange 57L may be deviated in a certain area, as illustrated in FIG. 7B. FIG. 7B illustrates a state in which the fixing nip Na is positioned toward the −Z side, i.e., side separating from the guide surface 57*a* of the flange 57L, compared to FIG. 7A. In this case, the inner surface of the film 51 may be separated from the guide surface 57*a* at the outlet portion Cc of the deformation regulating surface 57*c*. Therefore, in the outlet portion Cc, the distance d between the deformation regulating surface 57*c* and the guide surface 57*a* is set to be increased toward the terminal end of the deformation regulating surface 57*c*, such that the outlet surface of the film 51 may be prevented from sliding strongly against the deformation regulating surface 57*c* at the outlet portion Cc. Thereby, the possibility of the film 51 deforming toward the inner diameter side of the film 51 by the force received from the deformation regulating surface 57*c* at the outlet portion Cc may be reduced.

As described, according to the first modified example, the possibility of occurrence of damages to the end portion of the film may be reduced similar to the first embodiment, while preventing the outer surface of the film from sliding strongly against the deformation regulating surface at the inlet portion and the outlet portion.

Second Embodiment

A configuration of a second embodiment will be described. Unless denoted otherwise, the components denoted with the same reference numbers as the first embodiment have approximately the same configurations and functions as those described in the first embodiment, such that the parts that differ from the first embodiment are mainly described.

In the present embodiment, a third surface of an end portion regulating member is provided on both the upstream side, i.e., −Y side, and the downstream side, i.e., +Y side, in the recording material conveyance direction. Further, the distance between the third surface and a first surface on the upstream side, i.e., −Y side, in the recording material conveyance direction is set to be smaller than the distance between the third surface and a first surface on the downstream side.

Figure 8B:
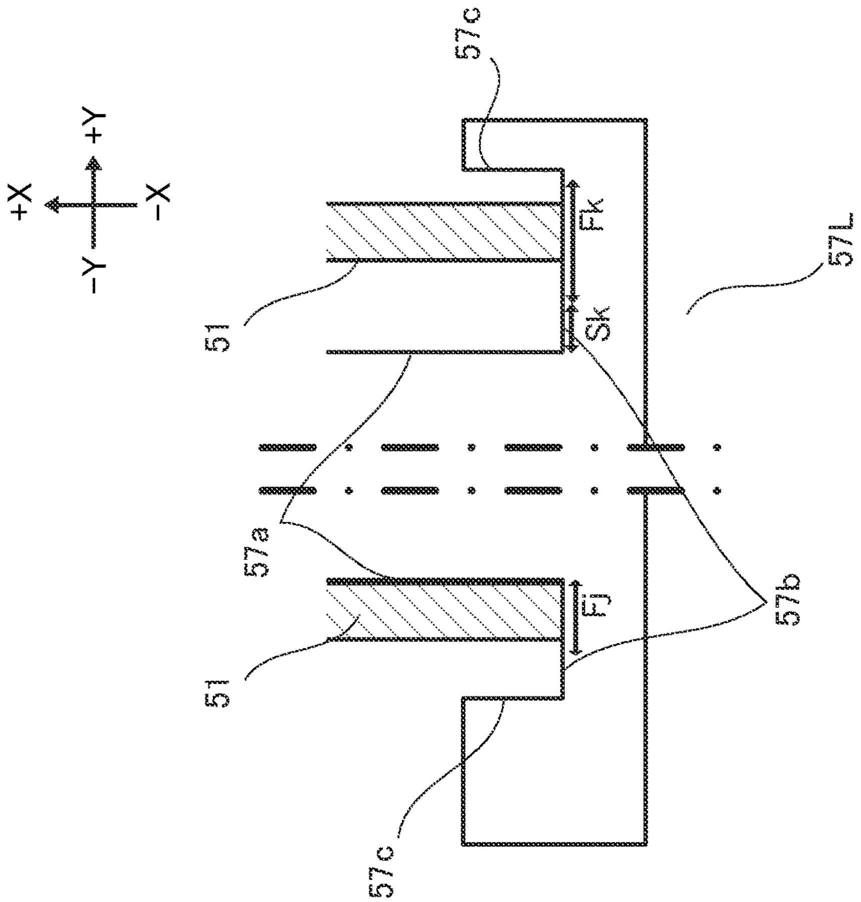
FIGS. 8A and 8B are each a view illustrating a configuration of a flange according to a second embodiment.
Figure 8A:
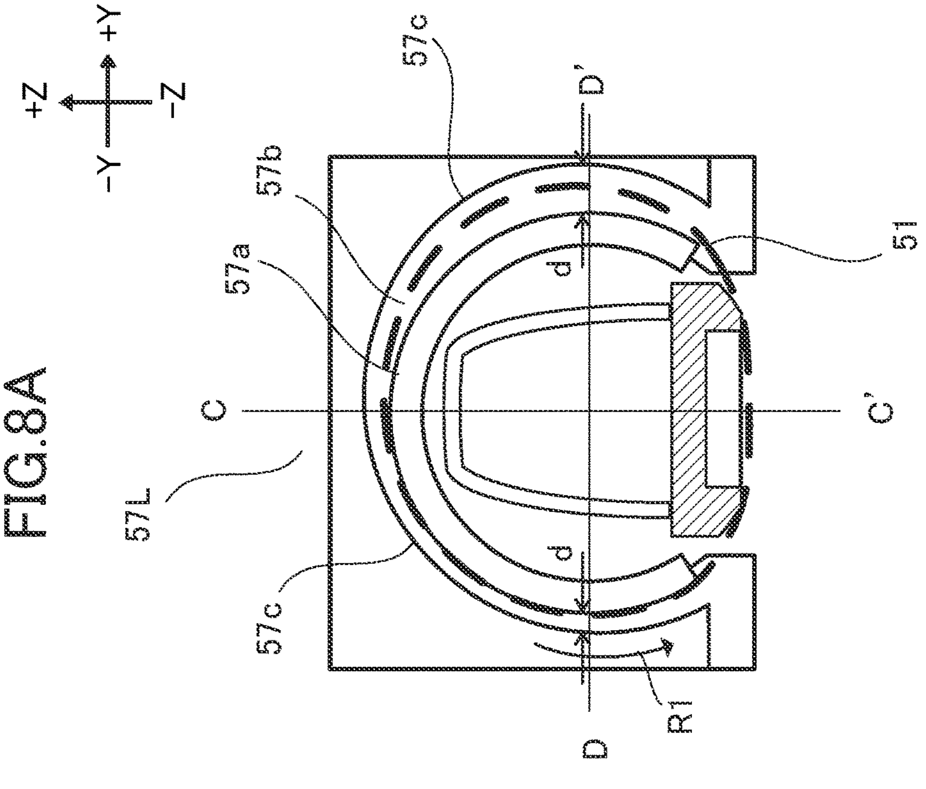

The detailed configuration of the second embodiment will be described with reference to FIGS. 8A and 8B. FIG. 8A is a view illustrating a configuration of the flange 57L according to the second embodiment. FIG. 8B is a cross-sectional view of the fixing unit 50 taken at line D-D', i.e., plane X-Y passing the rotational axis O, of FIG. 8A.

The deformation regulating surface 57*c* serving as the third surface is arranged to face the guide surface 57*a* across the entire area of the guide surface 57*a* serving as the first surface with respect to the direction of rotation R1 of the film 51. That is, the deformation regulating surface 57*c* of the second embodiment is disposed across both the range on the upstream side, i.e., −Y side, and the range on the downstream side, i.e., +Y side, in the recording material conveyance direction with respect to the short-side center Y0, i.e., line C-C', of the fixing nip Na.

In the second embodiment, the deformation regulating surface 57*c* is formed such that, regarding distance d between the deformation regulating surface 57*c* and the guide surface 57*a* in the radial direction Dr, the distance d on the upstream side, i.e., −Y side, in the recording material conveyance direction is smaller than the distance d on the downstream side, i.e., +Y side, in the recording material conveyance direction. Specifically, as illustrated in FIG. 8B, the distance d of the most upstream side, i.e., on line O-D of FIG. 8A, in the recording material conveyance direction is smaller than the distance d of the most downstream side, i.e., on line O-D' of FIG. 8A, in the recording material conveyance direction.

As illustrated in FIG. 8A, the distance d is continuously reduced on the downstream side, i.e., +Y side, in the recording material conveyance direction with respect to the short-side center Y0, i.e., line C-C', of the fixing nip Na. On the upstream side, i.e., −Y side, in the recording material conveyance direction with respect to the short-side center Y0, i.e., line C-C', of the fixing nip Na, the distance d is approximately fixed. However, regardless of the specific shape described above, the deformation regulating surface 57*c* should merely be formed such that the distance d on the upstream side, i.e., −Y side, in the recording material conveyance direction is set smaller than the distance d on the downstream side, i.e., +Y side, in the recording material conveyance direction.

In the range where the distance d is smallest on the upstream side, i.e., −Y side, in the recording material conveyance direction, it is preferable that the distance d is set to be equal to four times the film thickness of the film 51 or less. Thereby, the deformation regulating surface 57*c* may regulate the end portion of the film 51 abutting against the side end regulating surface 57*b* by lateral shift force from being deformed toward the outer diameter side of the film 51.

As illustrated in FIG. 8B, on the downstream side, i.e., +Y side, in the recording material conveyance direction, the deformation regulating surface 57*c* is positioned on the outer side in the radial direction than the presence range Fk of the film 51.

In the following case, the deformation regulating surface 57*c* may regulate the deformation of the film 51 on the downstream side, i.e., +Y side, in the recording material conveyance direction. For example, due to reasons such as the inner diameter of the film 51 being greater than the manufacture tolerance, the rotational track of the film 51 may be positioned outside the normal presence range Fk of the film 51. In that case, it is assumed that the end face of the film 51 is slid strongly against the side end regulating surface 57*b* of the flange 57L on the downstream side, i.e., +Y side, in the recording material conveyance direction. In such a case, the deformation regulating surface 57*c* may regulate the end portion of the film 51 from being deformed toward the outer diameter side of the film 51 by reactive force from the side end regulating surface 57*b* on the downstream side, i.e., +Y side, in the recording material conveyance direction.

As described above, if the film 51 is in contact with the flange 57L by lateral shift force, in many cases, the longitudinal direction A1 of the film 51 is inclined (FIG. 5), and the end face of the film 51 is often slid more strongly against the side end regulating surface 57*b* at the downstream side, i.e., +Y side, in the recording material conveyance direction. However, in a case where the assemble tolerance of the flange 57L is great, it may be possible that the end face of the film 51 is slid strongly against the side end regulating surface 57*b* of the flange 57L at the downstream side, i.e., +Y side, in the recording material conveyance direction.

As described, according to the second embodiment, the possibility of occurrence of damages to the end portion of the film may be reduced similar to the first embodiment, while regulating the end portion of the film from being deformed on the downstream side, i.e., +Y side, in the recording material conveyance direction.

Third Embodiment

A configuration of a third embodiment will be described. Unless denoted otherwise, the components denoted with the same reference numbers as the first embodiment have approximately the same configurations and functions as those described in the first embodiment, such that the parts that differ from the first embodiment are mainly described.

According to the present embodiment, an inclined portion that is inclined with respect to a longitudinal direction of the film is provided on a second surface of an end portion regulating member, which enables to regulate the end portion of the film from being deformed to the outer diameter side of the film.

Figure 9:
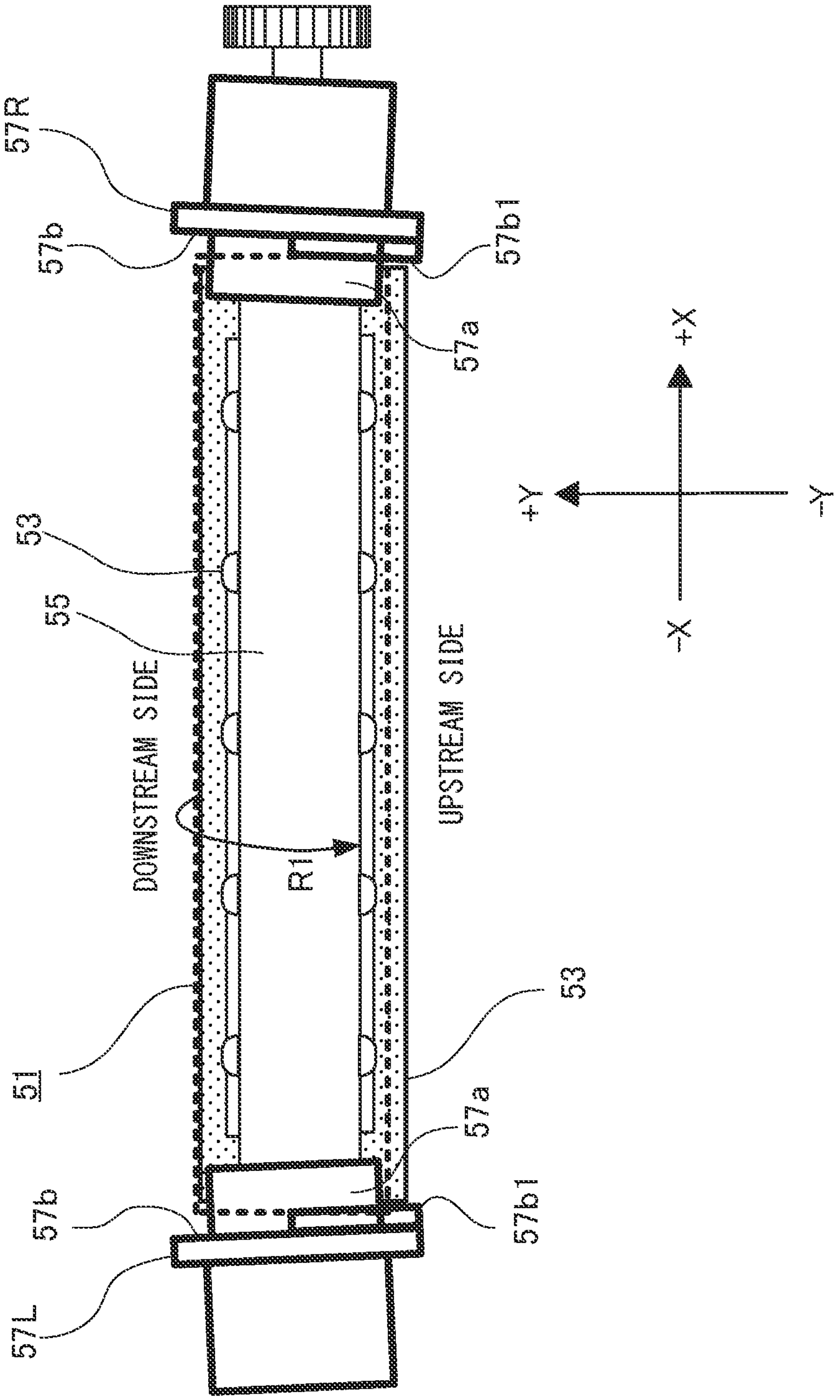
FIG. 9 is a view illustrating a configuration of a flange according to a third embodiment.

FIG. 9 is a view illustrating a state where a fixing unit 50 according to the third embodiment is viewed from a +Z side. As illustrated in FIG. 9, according to the present embodiment, each side end regulating surface 57*b* of flanges 57L and 57R is provided with an inclined portion 5761 and a non-inclined portion 57*b*2 described later.

Similar to the first embodiment, the flanges 57L and 57R and the stay 55 are fit and mutually positioned with respect to each other, and the stay 55 and the nip forming member 52 are fit and mutually positioned with respect to each other. Further, the film 51 is loosely retained on the outer circumference side of the nip forming member 52 and the guide surface 57*a* of the flanges 57L and 57R.

Inclination of Flange

In the present embodiment, the flanges 57L and 57R are fit in an inclined state to the stay 55. That is, when viewed in the Z direction, the flanges 57L and 57R are inclined such that the distance in the X direction between the side end regulating surfaces 57*b*, i.e., non-inclined portions 57*b*2, of the flanges 57L and 57R is narrower toward the upstream side, i.e., −Y side, in the recording material conveyance direction. In other words, the end portion regulating member is arranged in such a posture in which the non-inclined portions of the second surface where the inclined portion is not provided are inclined to be closer to the center of the film in the longitudinal direction toward the downstream side in the recording material conveyance direction.

By arranging the flanges 57L and 57R in an inclined manner as described above, the end portion of the film 51 may be in contact more reliably with the side end regulating surface 57*b* at the upstream side, i.e., −Y side, in the recording material conveyance direction, and may be in a noncontact state or in a weak contact state at the downstream side, i.e., +Y side. As described above, during rotation of the film 51, the presence range Fj (FIG. 5C) of the film 51 on the upstream side, i.e., −Y side, in the recording material conveyance direction is narrower than the presence range Fk of the film 51 on the downstream side, i.e., +Y side. That is, the rotational track of the film 51 is more stable on the upstream side, i.e., −Y side, than the downstream side, i.e., +Y side, in the recording material conveyance direction. Therefore, by inclining the flanges 57L and 57R as described above, the end portion of the film 51 may be in contact with the side end regulating surface 57*b* on the upstream side, i.e., −Y side, in the recording material conveyance direction where the rotational track of the film 51 is stable.

Inclined Portion of Side End Regulating Surface

Figure 10A:
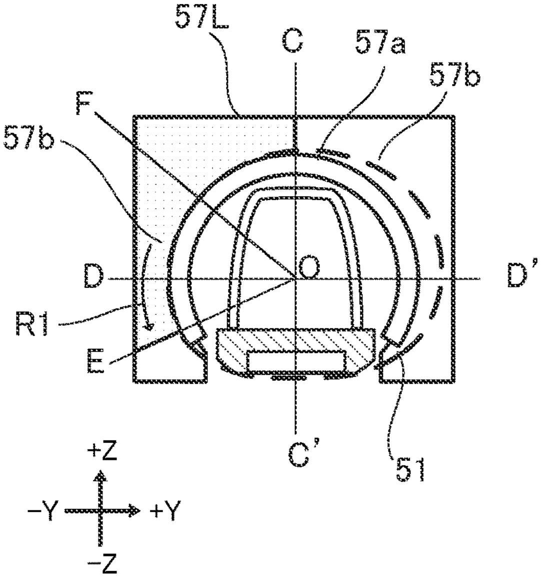
FIGS. 10A to 10D are each a view illustrating a configuration of the flange according to the third embodiment.
Figure 10B:
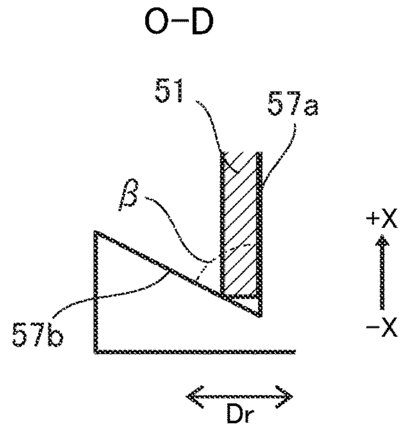
Figure 10C:
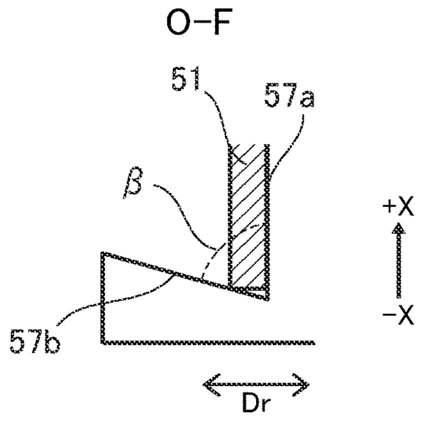
Figure 10D:
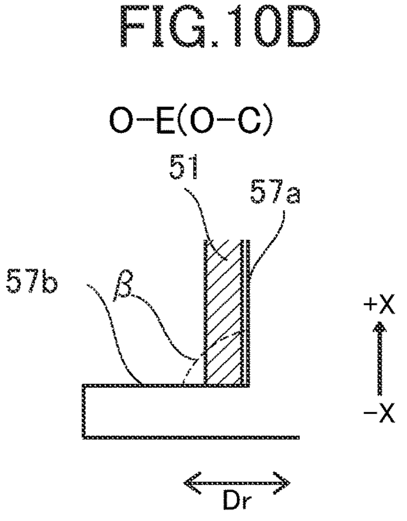

With reference to FIGS. 10A to 10D, the shape of the flange 57 according to the present embodiment will be described in detail. In the respective drawings of FIGS. 10A to 10D, it is assumed that the film 51 is abutted against the side end regulating surface 57*b* of the flange 57L by receiving lateral shift force. FIG. 10A is a view illustrating the positional relationship between the flange 57L and the film 51 according to the third embodiment. FIG. 10B is a cross-sectional view of the fixing unit 50 at line O-D of FIG. 10A. FIG. 10C is a cross-sectional view of the fixing unit 50 at line O-F of FIG. 10A. FIG. 10D is a cross-sectional view of the fixing unit 50 at line O-C of FIG. 10A. The cross-section of the fixing unit 50 at line O-E of FIG. 10A is similar to that of FIG. 10D.

As illustrated in FIGS. 10A to 10D, the flange 57L according to the present embodiment includes the guide surface 57*a* serving as a first surface and the side end regulating surface 57*b* serving as a second surface. The side end regulating surface 57*b* is a surface intersecting the longitudinal direction, i.e., X direction, of the film 51. The guide surface 57*a* extends toward the longitudinal center of the film 51 in the X direction from the side end regulating surface 57*b*.

A part of the side end regulating surface 57*b* is the inclined portion 57*b*1 inclined toward the longitudinal center of the film 51 in the X direction toward the outer side in the radial direction Dr. The inclined portion 57*b*1 is formed in the area including the most upstream portion, i.e., portion on line O-D, in the recording material conveyance direction of the guide surface 57*a*. Regarding the direction of rotation R1 of the film 51, the inclined portion 57*b*1 according to the present embodiment is formed in the area from the short-side center Y0, i.e., line O-C, of the fixing nip Na to a position, i.e., line O-E, immediately before the terminal end of the guide surface 57*a* in the direction of rotation R1 of the film 51.

The range of the side end regulating surface 576 excluding the inclined portion 5761 is the non-inclined portion 5762 perpendicular to the guide surface 57*a*. Line O-C and line O-E of FIG. 10A is the boundary between the inclined portion 57*b*1 and the non-inclined portion 5762.

As illustrated in FIGS. 10B to 10D, on the plane including the rotational axis O, the angle between the side end regulating surface 57*b* and the guide surface 57*a* is set to an opposing angle β. The opposing angle β is varied according to the position in the direction of rotation R1 of the film 51.

In FIG. 10A, β=90° on line O-C, β=70° on line O-F, β=50° on line O-D, and β=90° on line O-E. At the position of the most upstream portion (most upstream portion position), i.e., on line O-D, in the recording material conveyance direction of the guide surface 57*a*, the opposing angle β is smallest. Further, the inclined portion 57*b*1 and the non-inclined portion 5762 are formed such that the opposing angle β is varied continuously with respect to the direction of rotation R1 of the film 51. The opposing angle between the non-inclined portion 5762 and the guide surface 57*a* of the side end regulating surface 57*b* is 90° and fixed.

As described, according to the present embodiment, the inclined portion 57*b*1 is provided on the side end regulating surface 57*b* of the flange 57L, such that the opposing angle β with respect to the guide surface 57*a* is an acute angle. The inclined portion 57*b*1 is capable of regulating the end portion of the film 51 abutted against the side end regulating surface 57*b* by lateral shift force from being deformed toward the outer diameter side of the film 51.

In order to suppress deformation of the film 51 more effectively, it is preferable for the opposing angle β to be 20° or more and 87° or less in at least a part of the inclined portion 57*b*1. As according to the present embodiment, it is even more preferable for the opposing angle β to be 70° or less in at least a part of the inclined portion 5761.

Figure 11:
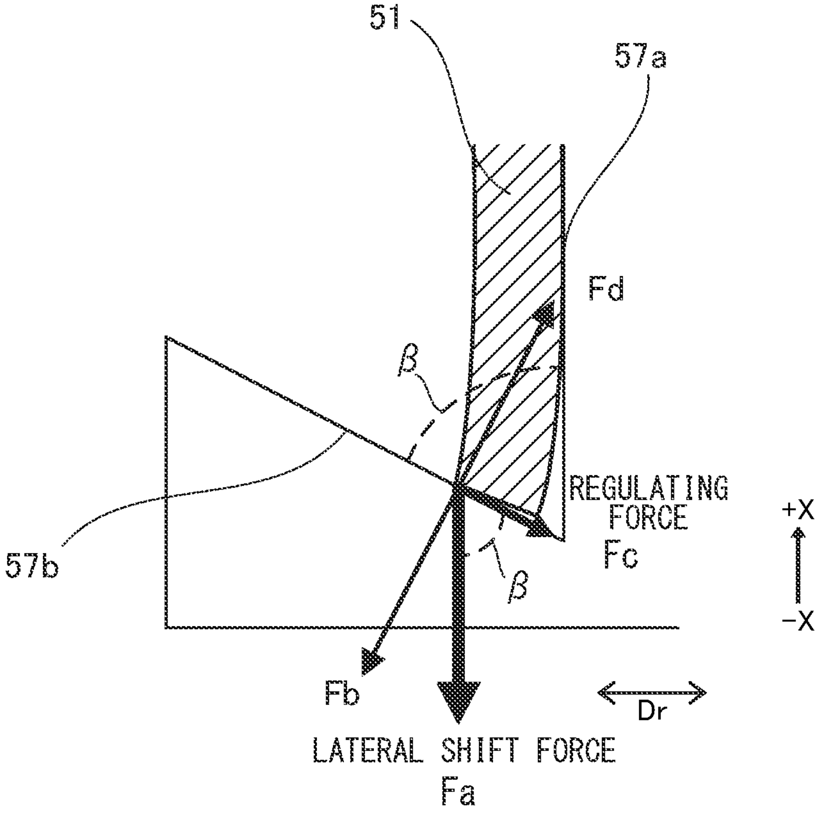
FIG. 11 is a view illustrating a function of an inclined portion of a side end regulating surface according to the third embodiment.

The function of the inclined portion 57*b*1 disposed on the side end regulating surface 57*b* will be described with reference to FIG. 11. FIG. 11 is a cross-sectional view of the fixing unit 50 at line O-D of FIG. 10A, i.e., a plane passing through the rotational axis O of the film 51 and the most upstream portion position in the recording material conveyance direction of the guide surface 57*a*. Further, FIG. 11 illustrates a state in which the lateral shift force acting on the film 51 is stronger compared to FIG. 10B, and the end portion of the film 51 is slightly elastically deformed.

As described in the first embodiment, during rotation of the film 51, the inner surface of the film 51 is in contact with the guide surface 57*a* on the upstream side, i.e., −Y side, in the recording material conveyance direction, and the film 51 is not easily deformed toward the inner diameter side. Therefore, as illustrated in FIG. 11, as the lateral shift force Fa acting on the film 51 becomes stronger, the end portion of the film 51 tends to be deformed toward the outer diameter side of the film 51.

The force that acts on the contact portion between the end portion of the film 51 and the side end regulating surface 57*b* is as described below. The lateral shift force Fa is the force in the X direction applied on the film 51, and it may be decomposed into a force Fb in a radial direction Df perpendicular to the side end regulating surface 57*b* and a force Fc along the side end regulating surface 57*b*. The force Fb is the force by which the film 51 pushes the side end regulating surface 57*b*, and as a normal component of reaction thereof, the film 51 is pushed back by a force Fd from the side end regulating surface 57*b*. The force Fc is a regulating force acting inward toward the radial direction Dr on the end portion of the film 51. The force Fc is a resultant force of the lateral shift force Fa and the normal component of reaction (Fd).

In a state where the lateral shift force Fa acting on the film 51 is increased and the film 51 is forced to deform toward the outer side in the radial direction, the end portion of the film 51 is regulated from deforming toward the outer side in the radial direction by the regulating force (Fc) acting thereon. The regulating force acts constantly while the inclined portion 5761 of the side end regulating surface 57*b* and the film 51 are abutted. Therefore, compared to the first embodiment, the present embodiment can cause the regulating force to act from an initial stage of deformation of the film 51.

The magnitude of the regulating force (Fc) is represented by $Fc=Fa\cdot\cos\beta$. Therefore, the regulating force (Fc) becomes greater as the opposing angle β between the inclined portion 57*b*1 of the side end regulating surface 57*b* and the guide surface 57*a* becomes smaller, such that the deformation of the film 51 may be regulated more effectively. However, it should be noted that if a strong regulating force (Fc) acts on a range in which the inner surface of the film 51 is separated from the guide surface 57*a*, the film 51 may be deformed toward the inner side in the radial direction.

As described, according to the present embodiment, the flanges 57L and 57R are arranged in an inclined manner (FIG. 9) to the stay 55, such that mainly on the upstream side, i.e., −Y side, in the recording material conveyance direction, the end portion of the film 51 comes into contact with the side end regulating surface 57*b*. Therefore, at a position of the most upstream portion in the recording material conveyance direction of the guide surface 57*a*, i.e., on line O-D of FIG. 10A, the end portion of the film 51 comes into the strongest contact with the side end regulating surface 57*b*. Meanwhile, the opposing angle β at the position of the most upstream portion in the recording material conveyance direction of the guide surface 57*a*, i.e., on line O-D of FIG. 10A, is set to the smallest value. Thereby, the strongest regulating force (Fc) may act on the position where the deformation of the film 51 toward the outer diameter side is most likely to occur.

Meanwhile, due to the inclination of the flanges 57L and 57R, the contact between the film 51 and the side end regulating surface 57*b* becomes weaker where the film 51 separates further from line O-D of FIG. 10A toward the upstream direction or the downstream direction in the direction of rotation R1 of the film 51. At the position most downstream in the recording material conveyance direction of the guide surface 57*a*, i.e., on line O-D' of FIG. 10A, the contact between the film 51 and the side end regulating surface 57*b* becomes weakest, including a non-contact state. Therefore, on the downstream side, i.e., +Y side, in the recording material conveyance direction, there is little need to regulate deformation of the end portion of the film 51. Therefore, the inclined portion 57*b*1 is not provided on the downstream side, i.e., +Y side, in the recording material conveyance direction so as to prevent the film 51 from being in strong contact with the inclined portion 57*b*1 and deforming toward the inner diameter side.

Further, as described in the first embodiment, during rotation of the film 51, the inner surface of the film 51 separates from the guide surface 57*a* on the downstream side, i.e., +Y side, in the recording material conveyance direction. The distance from the guide surface 57*a* to the inner surface of the film 51 becomes greatest at the position of the most downstream portion (most downstream portion position), i.e., on line O-D' of FIG. 10A, in the recording material conveyance direction of the guide surface 57*a*. Meanwhile, at the position most upstream in the recording material conveyance direction of the guide surface 57*a*, i.e., on line O-D of FIG. 10A, the distance from the guide surface 57*a* to the inner surface of the film 51 becomes smallest, such that they are in the contact state. That is, if the inclined portion 57*b*1 is provided on the downstream side, i.e., +Y side, in the recording material conveyance direction, the film 51 will be in contact with the inclined portion 57*b*1 at a position separated from the boundary between the guide surface 57*a*, and the film 51 may receive a strong force toward the inner side in the radial direction from the inclined portion 5761.

Therefore, according to the present embodiment, the inclined portion 57*b*1 is configured such that the opposing angle β is smaller toward the downstream side, i.e., +Y side, in the recording material conveyance direction from the most upstream portion position, i.e., on line O-D of FIG. 10A, in the recording material conveyance direction of the guide surface 57*a*. Thereby, the film 51 may be prevented from being in strong contact with the inclined portion 57*b*1 and deforming toward the inner diameter side.

Further, since the inclined portion 57*b*1 is not provided on the downstream side, i.e., +Y side, in the recording material conveyance direction with respect to the short-side center Y0 of the fixing nip Na, it becomes possible to prevent the film 51 from being in strong contact with the inclined portion 57*b*1 and deforming toward the inner diameter side.

As described, according to the third embodiment, it becomes possible to reduce the possibility of damages occurring to the end portion of the film similar to the first embodiment, and specifically, to regulate deformation of the film toward the outer diameter side from even a small stage of deformation quantity of the film.

Fourth Embodiment

The configuration of a fourth embodiment will be described. Unless denoted otherwise, the components denoted with the same reference numbers as the first and third embodiments have approximately the same configurations and functions as those described in the first and third embodiments, such that the parts that differ from the first and third embodiments are mainly described.

Figure 12A:
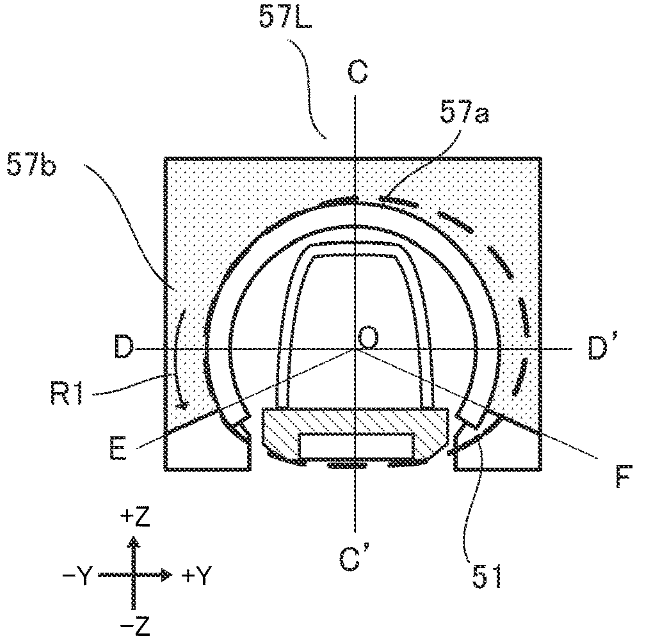
FIGS. 12A to 12D are each a view illustrating a configuration of a flange according to a fourth embodiment.
Figure 12B:
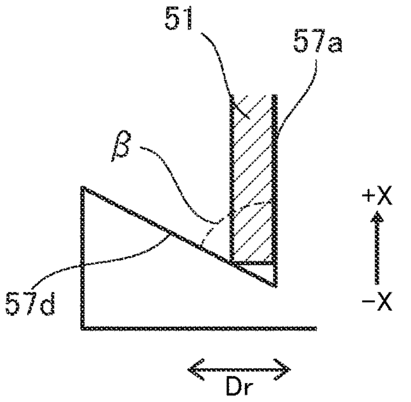
Figure 12C:
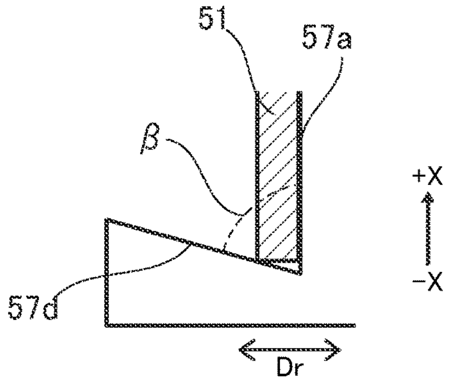
Figure 12D:
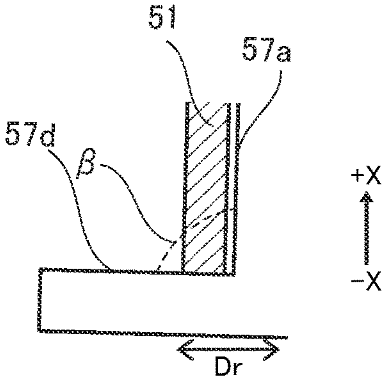

A shape of a flange 57 according to the present embodiment will be described in detail with reference to FIGS. 12A to 12D. FIG. 12A is a view illustrating a positional relationship between the flange 57L and the film 51 according to the fourth embodiment. FIG. 12B is a cross-sectional view of the fixing unit 50 at line O-D of FIG. 12A. FIG. 12C is a cross-sectional view of the fixing unit 50 at line O-E of FIG. 12A. FIG. 12D is a cross-sectional view of the fixing unit 50 at line O-C of FIG. 12A. The cross-sectional view of the fixing unit 50 at line O-F of FIG. 12A is similar to FIG. 12D.

Unlike the third embodiment, according to the present embodiment, the inclined portion **57*b*1 of the side end regulating surface 57*b* is also provided on the downstream side, i.e., +Y side, in the recording material conveyance direction with respect to the short-side center Y0 of the fixing nip Na. The inclined portion 57*b*1 is provided across the entire area of the side end regulating surface 57*b* excluding the sloped portion SL (FIGS. 1B and 1C). Therefore, even on the downstream side, i.e., +Y side, in the recording material conveyance direction, the opposing angle β between the side end regulating surface 57*b* and the guide surface 57*a*** is an acute angle.

In FIG. 12A, β=90° on line O-F, β=70° on line O-C, β=50° on line O-D, and β=90° on line O-E. That is, at a position on the most upstream portion, i.e., on line O-D, in the recording material conveyance direction of the guide surface **57*a*, the value of the opposing angle β becomes smallest. Further, the inclined portion 57*b*1 is formed such that the opposing angle β is varied continuously with respect to the direction of rotation R1 of the film 51**.

As described, according to the present embodiment, the inclined portion **57*b*1 of the side end regulating surface 57*b* is formed on both the upstream side, i.e., −Y side, and the downstream side, i.e., +Y side, in the recording material conveyance direction with respect to the short-side center Y0 of the fixing nip Na, and the opposing angle β is set to an acute angle. Then, the value of β at the most upstream portion position, on line O-D, in the recording material conveyance direction of the guide surface 57*a* is set to be smaller than the value of β at the most downstream portion position, i.e., on line O-D', in the recording material conveyance direction of the guide surface 57*a***.

Thereby, similar to the third embodiment, it becomes possible to reduce the possibility of damages occurring to the end portion of the film, and specifically, to regulate deformation of the film toward the outer diameter side from even a small stage of deformation quantity of the film.

Fifth Embodiment

The configuration of a fifth embodiment will be described. Unless denoted otherwise, the components denoted with the same reference numbers as the first embodiment have approximately the same configurations and functions as those described in the first embodiment, such that the parts that differ from the first embodiment are mainly described.

The present embodiment differs from the first embodiment in that a deformation regulating surface **57*c*** serving as a third surface of an end portion regulating member is formed as an inclined surface.

Figure 13B:
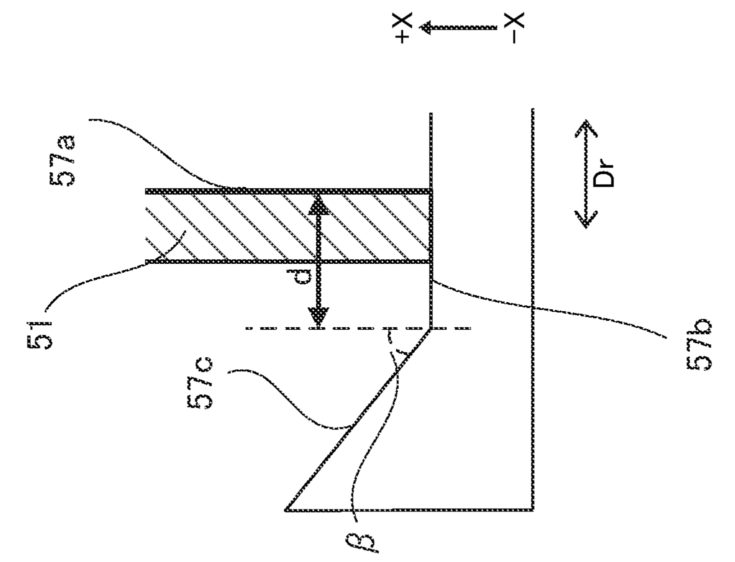
FIGS. 13A and 13B are each a view illustrating a configuration of a flange according to a fifth embodiment.
Figure 13A:
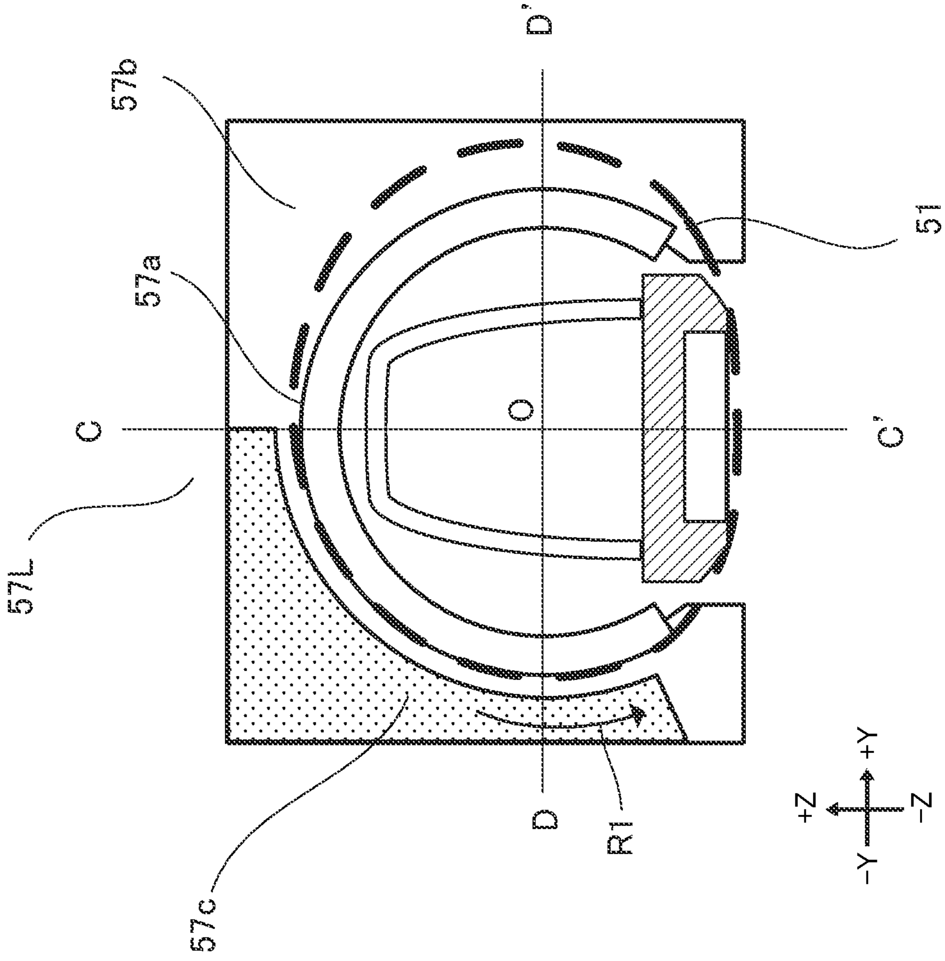

The configuration of the fifth embodiment will be described with reference to FIGS. 13A and 13B. FIG. 13A is a view illustrating a positional relationship between the flange 57L and the film 51 according to the fifth embodiment. FIG. 13B is a cross-sectional view of the fixing unit 50 at line O-D of FIG. 13A.

As illustrated in FIG. 13A, the flange 57L includes the deformation regulating surface **57*c* serving as a third surface on the upstream side, i.e., −Y side, left side of line C-C' of FIG. 13A, in the recording material conveyance direction with respect to the short-side center Y0 of the fixing nip Na. The deformation regulating surface 57*c* is in contact with the side end regulating surface 57*b* serving as a second surface. The side end regulating surface 57*b* is in contact with the guide surface 57*a*** serving as a first surface.

The deformation regulating surface **57*c* of the present embodiment is inclined with respect to the side end regulating surface 57*b* such that the deformation regulating surface 57*c* is inclined toward the longitudinal center, i.e., toward +X side, of the film 51 toward an outer side in the radial direction Dr from a boundary with the side end regulating surface 57*b*. That is, the deformation regulating surface 57*c* is inclined with respect to the guide surface 57*a* such that the deformation regulating surface 57*c* recedes further away from the guide surface 57*a* serving as a first surface at a position closer to a center of the film 51 in the X direction, i.e., longitudinal direction of the film 51**.

The distance d between the deformation regulating surface **57*c* and the guide surface 57*a* is defined as a smallest distance between the guide surface 57*a* and the deformation regulating surface 57*c*. That is, the distance d is a distance in the radial direction Dr from the boundary between the deformation regulating surface 57*c* and the side end regulating surface 57*b* to the guide surface 57*a*. In the present embodiment, the distance d between the deformation regulating surface 57*c* and the guide surface 57*a*** is approximately fixed, and the value thereof is 500 μm.

Further, an inclination angle of the deformation regulating surface **57*c* against the guide surface 57*a*** is β. In the present embodiment, β is set to 60° and fixed.

In order to regulate deformation of the end portion of the film 51 by lateral shift force effectively, it is preferable that at least at a portion of the deformation regulating surface **57*c*, Bis 20° or more and 87° or less. Further, the distance d is preferably four times the film thickness of the film 51** or less.

According to the present embodiment, in a state where the film 51 receives lateral shift force and starts to deform toward the outer side in the radial direction, the film 51 comes into contact with the deformation regulating surface **57*c*. Then, due to the same reason as that described with reference to FIG. 11, by the end portion of the film 51 coming into contact with the deformation regulating surface 57*c* being inclined, regulating force toward the inner side in the radial direction acts on the film 51. Thereby, the end portion of the film 51 is regulated from being deformed toward the outer diameter side of the film 51**.

As described, according to the fifth embodiment, similar to the first embodiment, it becomes possible to reduce the possibility of occurrence of damage to the end portion of the film.

Sixth Embodiment

The configuration of a sixth embodiment will be described. Unless denoted otherwise, the components denoted with the same reference numbers as the first and fifth embodiments have approximately the same configurations and functions as those described in the first and fifth embodiments, such that the parts that differ from the first and fifth embodiments are mainly described.

Figure 14A:
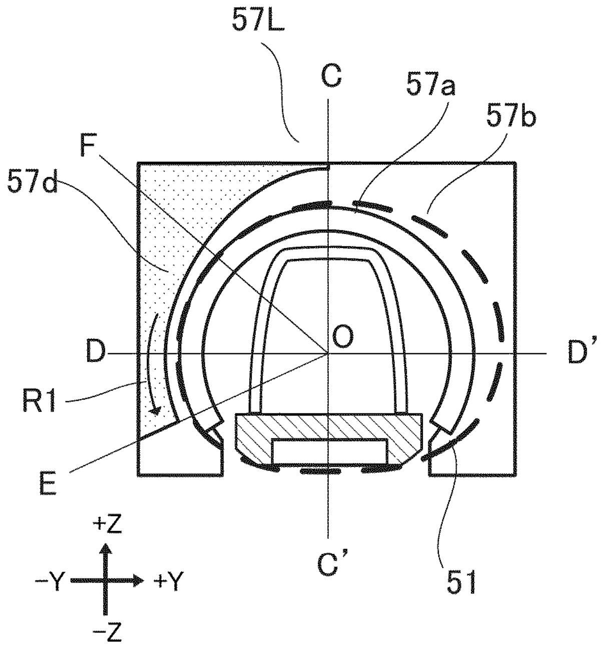
FIGS. 14A to 14D are each a view illustrating a configuration of a flange according to a sixth embodiment.
Figure 14B:
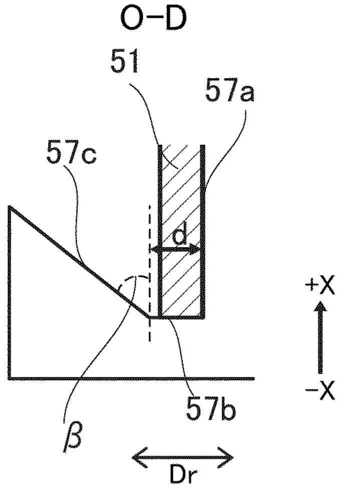
Figure 14C:
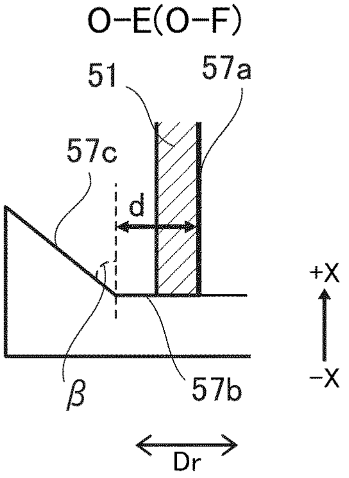
Figure 14D:
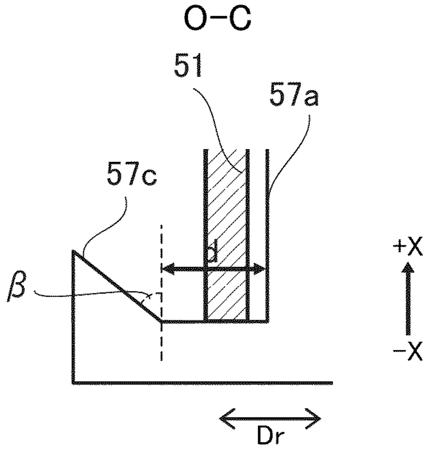

The shape of a flange 57 according to the present embodiment will be described in detail with reference to FIGS. 14A to 14D. FIG. 14A is a view illustrating a positional relationship between a flange 57L and the film 51 according to the sixth embodiment. FIG. 14B is a cross-sectional view of the fixing unit 50 at line O-D of FIG. 14A. FIG. 14C is a cross-sectional view of the fixing unit 50 at line O-E of FIG. 14A. FIG. 14D is a cross-sectional view of the fixing unit 50 at line O-C of FIG. 14A. The cross-section of the fixing unit 50 at line O-F of FIG. 14A is similar to FIG. 14C.

The present embodiment differs from the fifth embodiment in that a distance d between a deformation regulating surface 57*c* serving as a third surface of the end portion regulating member and a guide surface 57*a* serving as a first surface differs according to the position in the direction of rotation R1 of the film 51.

The distance d is 300 μm and narrowest on line O-D, 500 μm on line O-F and line O-E, and 700 μm on line O-C. The deformation regulating surface 57*c* is formed such that the distance d continuously varies with respect to the direction of rotation R1 of the film 51 between the lines.

The inclination angle of the deformation regulating surface 57*c* to the guide surface 57*a* is β. In the present embodiment, β is 30° and fixed.

As described, according to the present embodiment, the distance d between the deformation regulating surface 57*c* and the guide surface 57*a* is shortest at a most upstream portion position, i.e., on line O-D, in the recording material conveyance direction of the guide surface 57*a*. As the distance d becomes shorter, the film 51 comes into contact with the deformation regulating surface 57*c* at a smaller stage of deformation quantity of the film 51, and the film receives regulating force that regulates the deformation toward the outer diameter side of the film 51.

As described above, during rotation of the film 51, at the most upstream portion position, i.e., on line O-D, in the recording material conveyance direction of the guide surface 57*a*, the film 51 is generally in contact with the guide surface 57*a*. Further according to the present embodiment, the flange 57L is arranged in an inclined manner, similar to the third embodiment. Therefore, the film 51 is in contact with the side end regulating surface 57*b* most strongly on line O-D of FIG. 14A.

According to the present embodiment, the distance d between the deformation regulating surface 57*c* and the guide surface 57*a* is smallest on line O-D where the film 51 and the side end regulating surface 57*b* contact one another most strongly. Therefore, the regulating force may be caused to act on the film 51 from the deformation regulating surface 57*c* in a stage where the deformation quantity of the film 51 is small.

As described, according to the sixth embodiment, similar to the first embodiment, it becomes possible to reduce the possibility of occurrence of damages to the end portion of the film. Further, by varying the distance d, it becomes possible to cause an appropriate regulating force to act on each part in the direction of rotation of the film.

Seventh Embodiment

The configuration of a seventh embodiment will be described. Unless denoted otherwise, the components denoted with the same reference numbers as the first and fifth embodiments have approximately the same configurations and functions as those described in the first and fifth embodiments, such that the parts that differ from the first and fifth embodiments are mainly described.

Figure 15A:
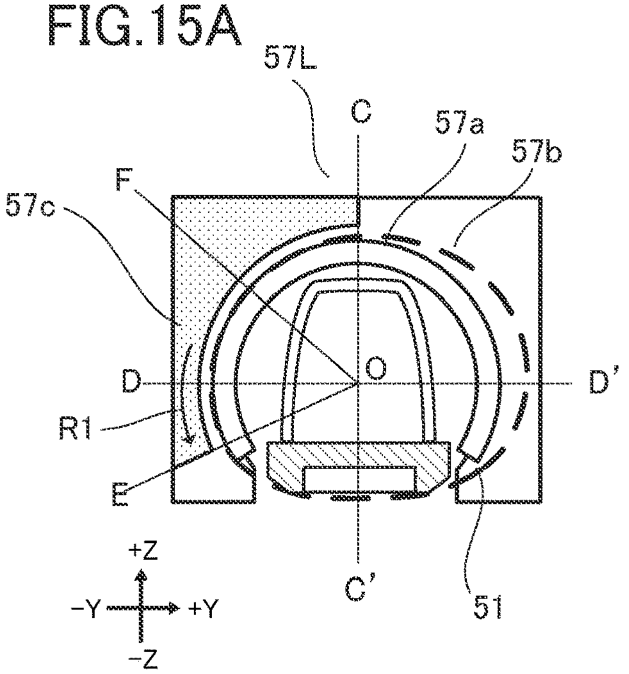
FIGS. 15A to 15D are each a view illustrating a configuration of a flange according to a seventh embodiment.
Figure 15B:
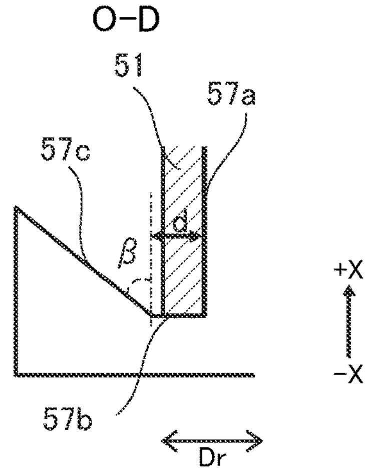
Figure 15C:
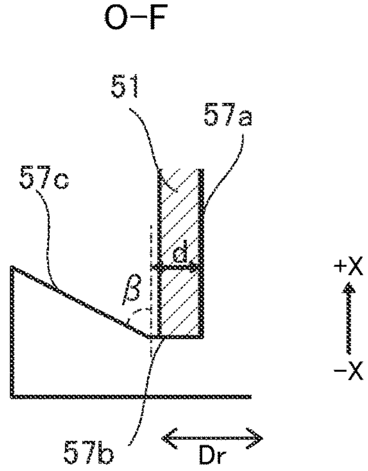
Figure 15D:
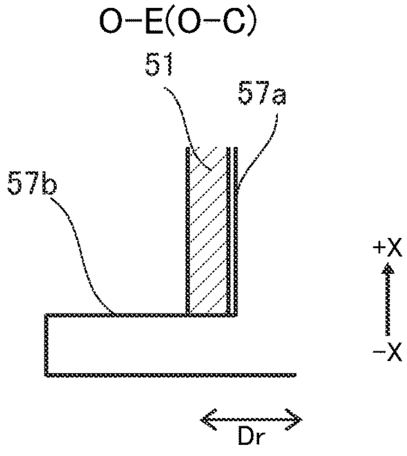

The shape of the flange 57 according to the present embodiment will be described in detail with reference to FIGS. 15A to 15D. FIG. 15A illustrates a positional relationship between the flange 57L and the film 51 according to the seventh embodiment. FIG. 15B is a cross-sectional view of the fixing unit 50 taken at line O-D of FIG. 15A. FIG. 15C is a cross-sectional view of the fixing unit 50 taken at line O-F of FIG. 15A. FIG. 15D is a cross-sectional view of the fixing unit 50 taken at line O-E of FIG. 15A. The cross-sectional view of the fixing unit 50 at line O-D of FIG. 15A is similar to FIG. 15D.

The present embodiment differs from the fifth embodiment in that an inclination angle (β) of the deformation regulating surface 57*c* serving as a third surface of the end portion regulating member with respect to the guide surface 57*a* serving as a first surface differs according to the position in the direction of rotation R1 of the film 51.

The deformation regulating surface 57*c* is disposed on the upstream side, i.e., −Y side, in the recording material conveyance direction with respect to the short-side center Y0 of the fixing nip Na. The distance d between the deformation regulating surface 57*c* and the guide surface 57*a* is fixed, and in the present embodiment, it is 300 μm.

The inclination angle of the deformation regulating surface 57*c* to the guide surface 57*a* is referred to as B. The inclination angle β is 30° and smallest on line O-D, 90° and greatest on line O-C, and 60° on line O-E and line O-F. The deformation regulating surface 57*c* is formed such that the inclination angle β varies continuously with respect to the direction of rotation R1 of the film 51 between the respective lines.

As mentioned above, during rotation of the film 51, the film 51 is in strong contact with the side end regulating surface 57*b* at the most upstream portion position, i.e., on line O-D, in the recording material conveyance direction of the guide surface 57*a*. In the present embodiment, an even stronger regulating force may be caused to act on the film 51 by forming the deformation regulating surface 57*c* such that the inclination angle β becomes smallest on line O-D.

As described, according to the seventh embodiment, similar to the first embodiment, it becomes possible to reduce the possibility of damages occurring to the end portion of the film. Further, by varying the inclination angle β, it becomes possible to cause an appropriate force to act on the respective parts in the direction of rotation of the film.

Eighth Embodiment

A configuration of an eighth embodiment will be described. Unless denoted otherwise, the components denoted with the same reference numbers as the first, fifth, and seventh embodiments have approximately the same configurations and functions as those described in the first, fifth, and seventh embodiments, such that the parts that differ from the first, fifth, and seventh embodiments are mainly described.

Figure 16A:
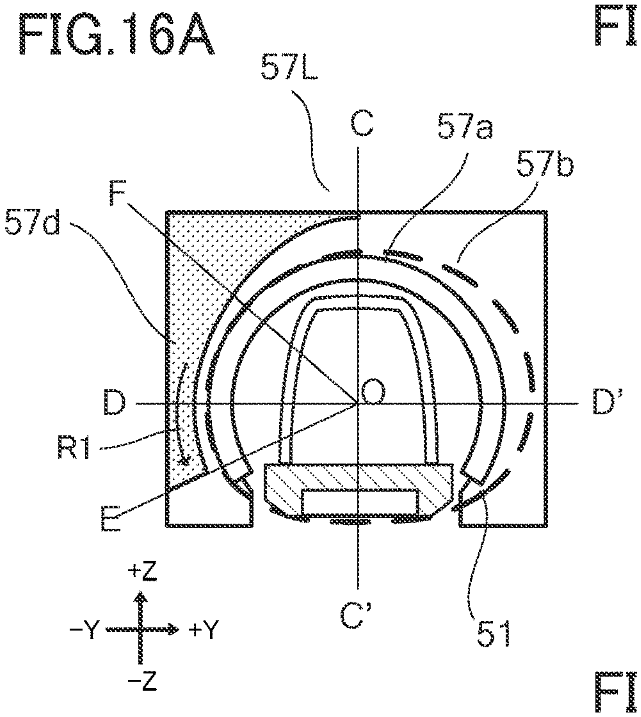
FIGS. 16A to 16D are each a view illustrating a configuration of a flange according to an eighth embodiment.
Figure 16B:
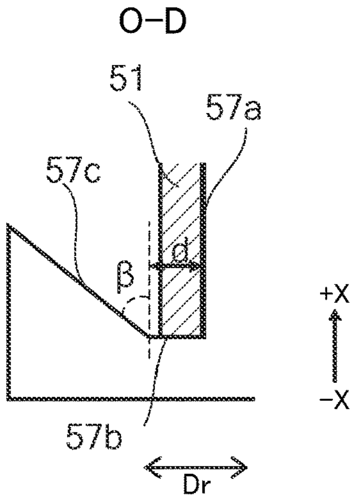
Figure 16C:
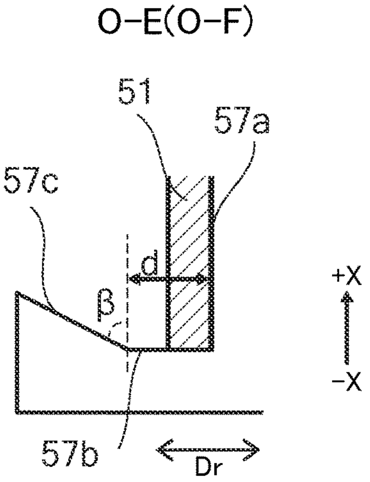
Figure 16D:
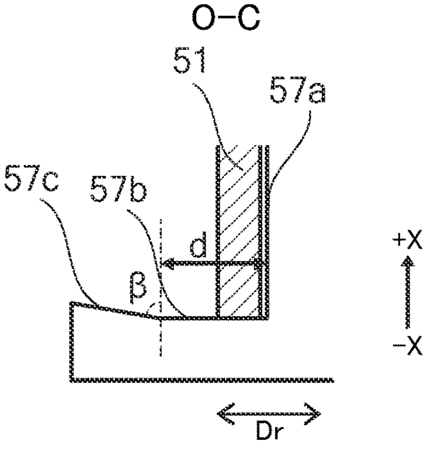

The shape of the flange 57 according to the present embodiment will be described in detail with reference to FIGS. 16A to 16D. FIG. 16A illustrates a positional relationship between the flange 57L and the film 51 according to the eighth embodiment. FIG. 16B is a cross-sectional view of the fixing unit 50 taken at line O-D of FIG. 16A. FIG. 16C is a cross-sectional view of the fixing unit 50 taken at line O-E of FIG. 16A. FIG. 16D is a cross-sectional view of the fixing unit 50 taken at line O-C of FIG. 16A. The cross-sectional view of the fixing unit 50 at line O-F of FIG. 16A is similar to FIG. 16C.

The present embodiment differs from the fifth embodiment in that an inclination angle β of the deformation regulating surface 57*c* serving as a third surface of the end portion regulating member with respect to the guide surface 57*a* serving as a first surface differs according to the position in the direction of rotation R1 of the film 51. Further, the present embodiment differs from the fifth embodiment in that a distance d between the deformation regulating surface 57*c* serving as the third surface of the end portion regulating member and the guide surface 57*a* serving as the first surface differs according to the position in the direction of rotation R1 of the film 51.

The deformation regulating surface 57*c* is disposed on the upstream side, i.e., −Y side, in the recording material conveyance direction with respect to the short-side center Y0 of the fixing nip Na. A distance d between the deformation regulating surface 57*c* and the guide surface 57*a* and an inclination angle β of the deformation regulating surface 57*c* with respect to the guide surface 57*a* varies according to the position in the direction of rotation R1 of the film 51. The distance d and the inclination angle β are d=300 μm and β=30° on line O-D, d=500 μm and β=60° on line O-D and line O-F, and d=700 μm and β=85° on line O-C. The deformation regulating surface 57*c* is formed such that the distance d and the inclination angle β vary continuously with respect to the direction of rotation R1 of the film 51 between the respective lines.

As mentioned above, during rotation of the film 51, the film 51 is in strong contact with the side end regulating surface 57*b* at the most upstream portion position, i.e., on line O-D, in the recording material conveyance direction of the guide surface 57*a*. In the present embodiment, by forming the deformation regulating surface 57*c* such that the distance d becomes smallest on line O-D, it becomes possible to have the regulating force act on the film 51 from the deformation regulating surface 57*c* at a stage where the deformation quantity of the film 51 is small. Further according to the present embodiment, an even stronger regulating force may be caused to act on the film 51 by forming the deformation regulating surface 57*c* such that the inclination angle β becomes smallest on line O-D.

As described, according to the eighth embodiment, similar to the first embodiment, it becomes possible to reduce the possibility of damages occurring to the end portion of the film. Further, by varying the distance d and the inclination angle β, it becomes possible to cause an appropriate regulating force to act on respective parts in the direction of rotation of the film.

Ninth Embodiment

A configuration of a ninth embodiment will be described. Unless denoted otherwise, the components denoted with the same reference numbers as the first and sixth embodiments have approximately the same configurations and functions as those described in the first and sixth embodiments, such that the parts that differ from the first and sixth embodiments are mainly described.

Figure 17A:
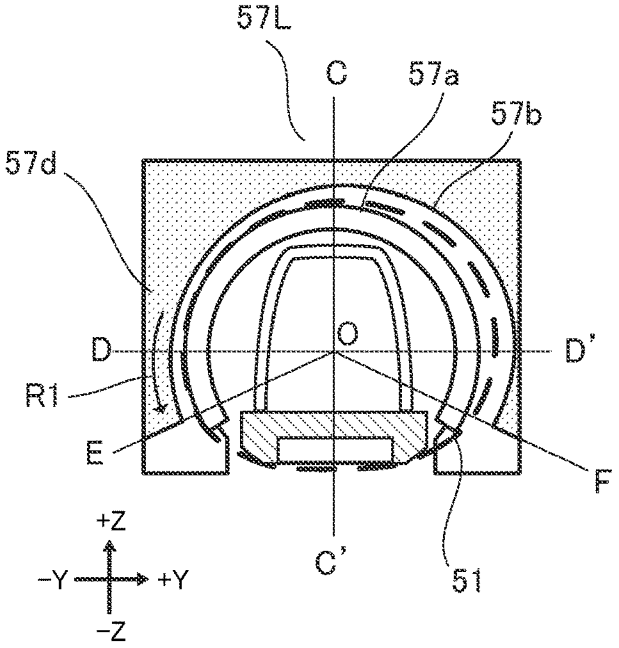
FIGS. 17A to 17D are each a view illustrating a configuration of a flange according to a ninth embodiment.
Figure 17B:
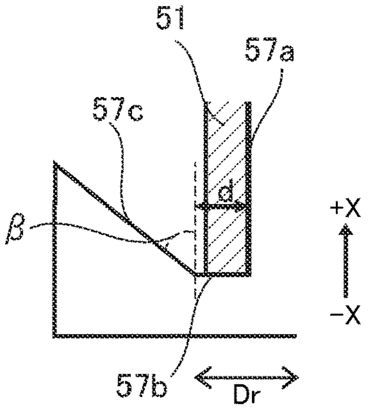
Figure 17C:
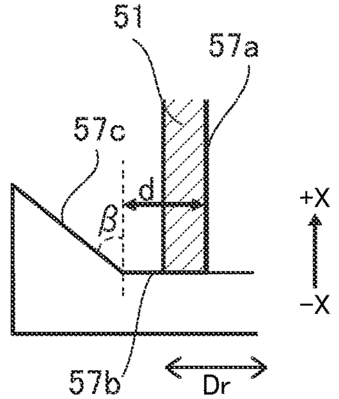
Figure 17D:
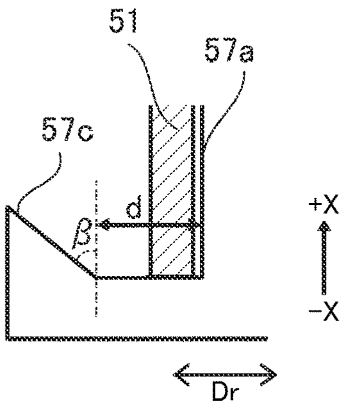

The shape of the flange 57 according to the present embodiment will be described in detail with reference to FIGS. 17A to 17D. FIG. 17A illustrates a positional relationship between the flange 57L and the film 51 according to the ninth embodiment. FIG. 17B is a cross-sectional view of the fixing unit 50 taken at line O-D of FIG. 17A. FIG. 17C is a cross-sectional view of the fixing unit 50 taken at line O-E of FIG. 17A. FIG. 17D is a cross-sectional view of the fixing unit 50 taken at line O-F of FIG. 17A. The cross-sectional view of the fixing unit 50 at line O-E of FIG. 17A is similar to FIG. 17C.

In the present embodiment, the deformation regulating surface 57*c* serving as a third surface is arranged on both the upstream side, i.e., −Y side, and the downstream side, i.e., +Y side, in the recording material conveyance direction with respect to the short-side center Y0 of the fixing nip Na. The deformation regulating surface 57*c* is inclined by a fixed inclination angle β to the guide surface 57*a* serving as a first surface, and the inclination angle β according to the present embodiment is 30°.

The distance d between the deformation regulating surface 57*c* and the guide surface 57*a* serving as a first surface differs according to the position in the direction of rotation R1 of the film 51. The distance d is 300 μm and narrowest on line O-D, 500 μm on line O-C, and 700 μm on line O-D'. The deformation regulating surface 57*c* is formed such that the distance d continuously varies with respect to the direction of rotation R1 of the film 51 between the lines.

As mentioned above, during rotation of the film 51, the film 51 is in strong contact with the side end regulating surface 57*b* at the most upstream portion position, i.e., on line O-D, in the recording material conveyance direction of the guide surface 57*a*. In the present embodiment, by forming the deformation regulating surface 57*c* such that the distance d becomes smallest on line O-D, regulating force may be caused to act on the film 51 from the deformation regulating surface 57*c* at a stage where the deformation quantity of the film 51 is small.

Meanwhile, the distance d at the most downstream portion position, i.e., on line O-D', in the recording material conveyance direction of the guide surface 57*a* is greater than the distance d at the most upstream portion position, i.e., on line O-D, in the recording material conveyance direction of the guide surface 57*a*. Therefore, even in a state where the inner surface of the film 51 is separated from the guide surface 57*a* during rotation of the film 51, the possibility of the film 51 deforming toward the inner diameter side by having the film 51 come in strong contact with the deformation regulating surface 57*c* on the downstream side, i.e., +Y side, in the recording material conveyance direction may be reduced.

As described, according to the ninth embodiment, similar to the first embodiment, it becomes possible to reduce the possibility of damages occurring to the end portion of the film. Further, by changing the distance d, it becomes possible to cause an appropriate regulating force to act on respective parts in the direction of rotation of the film.

Tenth Embodiment

A configuration of a tenth embodiment will be described. Unless denoted otherwise, the components denoted with the same reference numbers as the first and eighth embodiments have approximately the same configurations and functions as those described in the first and eighth embodiments, such that the parts that differ from the first and eighth embodiments are mainly described.

Figure 18A:
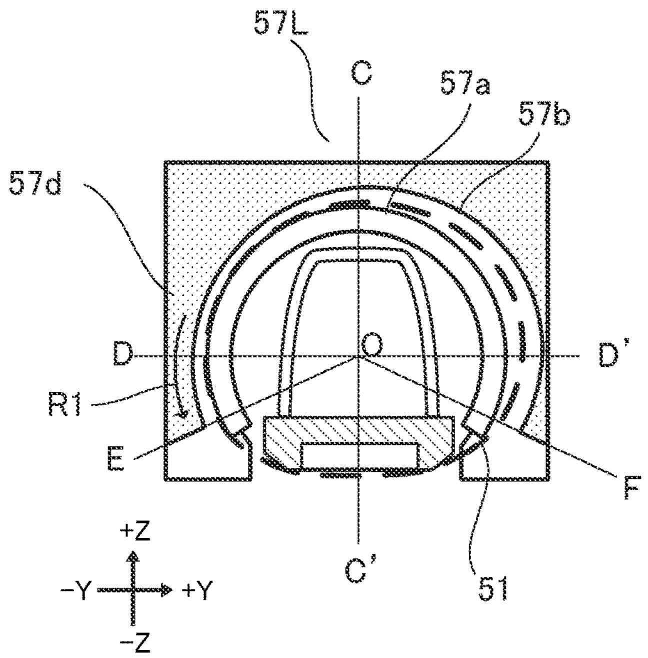
FIGS. 18A to 18D are each a view illustrating a configuration of a flange according to a tenth embodiment.
Figure 18B:
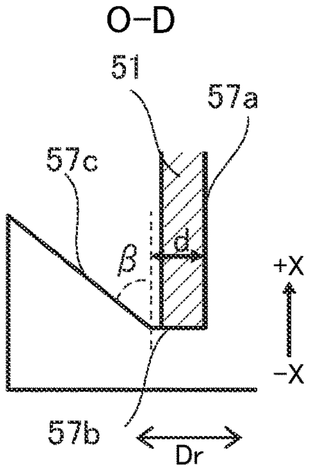
Figure 18C:
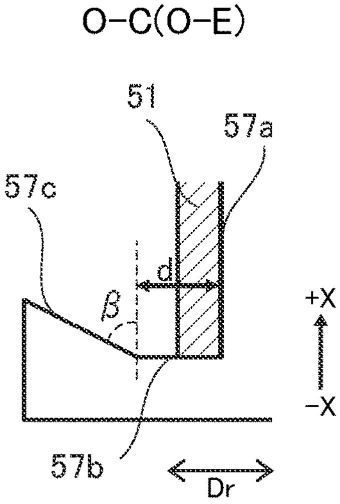
Figure 18D:
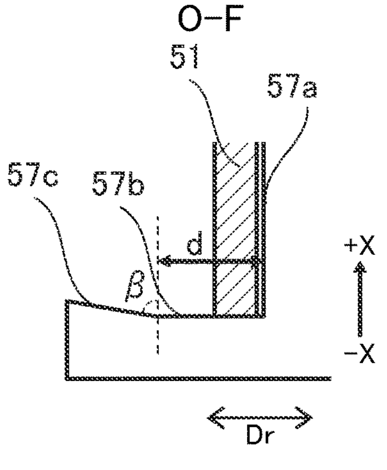

The shape of the flange 57 according to the present embodiment will be described in detail with reference to FIGS. 18A to 18D. FIG. 18A illustrates a positional relationship between the flange 57L and the film 51 according to the tenth embodiment. FIG. 18B is a cross-sectional view of the fixing unit 50 taken at line O-D of FIG. 18A. FIG. 18C is a cross-sectional view of the fixing unit 50 taken at line O-E of FIG. 18A. FIG. 18D is a cross-sectional view of the fixing unit 50 taken at line O-F of FIG. 18A. The cross-sectional view of the fixing unit 50 at line O-E of FIG. 18A is similar to FIG. 18C.

Similar to the eighth embodiment, a distance d between the deformation regulating surface 57*c* serving as the third surface and the guide surface 57*a* serving as the first surface differs according to the position in the direction of rotation R1 of the film 51. In addition, according to the present embodiment, an inclination angle β of the deformation regulating surface 57*c* to the guide surface 57*a* is varied according to the position in the direction of rotation R1 of the film 51.

The distance d and the inclination angle β are d=300 μm and β=30° on line O-D, d=500 μm and β=60° on line O-E and line O-C, and d=700 μm and β=85° on line O-F. The deformation regulating surface 57*c* is formed such that the distance d varies continuously with respect to the direction of rotation R1 of the film 51 between the respective lines As described above, during rotation of the film 51, at the most upstream portion position, i.e., on line O-D, in the recording material conveyance direction of the guide surface 57*a*, the film 51 is in strong contact with the side end regulating surface 57*b*. In the present embodiment, by forming the deformation regulating surface 57*c* such that the distance d becomes smallest on line O-D, it becomes possible to have the regulating force act on the film 51 from the deformation regulating surface 57*c* at a stage where the deformation quantity of the film 51 is small. Further according to the present embodiment, an even stronger regulating force may be caused to act on the film 51 by forming the deformation regulating surface 57*c* such that the inclination angle β becomes smallest on line O-D.

Meanwhile, the distance d at the most downstream portion position, i.e., on line O-D', in the recording material conveyance direction of the guide surface 57*a* is greater than the distance d at the most upstream portion position, i.e., on line O-D, in the recording material conveyance direction of the guide surface 57*a*. Further, the inclination angle β at the most downstream portion position, i.e., on line O-D', in the recording material conveyance direction of the guide surface 57*a* is greater than the inclination angle β at the most upstream portion position, i.e., on line O-D, in the recording material conveyance direction of the guide surface 57*a*. Therefore, even in a state where the inner surface of the film 51 is separated from the guide surface 57*a* during rotation of the film 51, the possibility of the film 51 deforming toward the inner diameter side by having the film 51 come in strong contact with the deformation regulating surface 57*c* on the downstream side, i.e., +Y side, in the recording material conveyance direction may be reduced.

As described, according to the tenth embodiment, similar to the first embodiment, it becomes possible to reduce the possibility of damages occurring to the end portion of the film. Further, by changing the distance d and the inclination angle β, it becomes possible to cause an appropriate regulating force to act on respective parts in the direction of rotation of the film.

According to the present disclosure, it becomes possible to provide a fixing unit where damaging of the film is less likely to occur, and an image forming apparatus equipped with the same.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-201446, filed on Dec. 16, 2022, which is hereby incorporated by reference herein in its entirety.

What is claimed is:

1. A fixing unit comprising:

a film having a tubular shape and extending in a longitudinal direction;

an internal guide arranged in an interior space of the film;

a heater configured to heat the film;

a rotator arranged to sandwich the film together with the internal guide, the rotator being configured to form a nip portion between the internal guide and the rotator and to nip a recording material with the film at the nip portion to convey the recording material; and an end portion regulator configured to be in sliding contact with the film and to regulate an end portion of the film in the longitudinal direction, wherein the end portion regulator includes a first surface facing an inner surface of the film, a second surface facing an end face of the film in the longitudinal direction, and a third surface facing an outer surface of the film and configured to regulate the end portion of the film from deforming in a manner separating from the first surface, wherein an entirety of the third surface is disposed on an upstream side of a center position of the nip portion in a conveyance direction of the recording material in the nip portion, and wherein the third surface is not provided on a downstream side of the center position in the conveyance direction.

2. The fixing unit according to claim 1, wherein the end portion regulator is configured to permit the end portion of the film to deform in a manner separating from the first surface on a downstream side of the center position of the nip portion in the conveyance direction of the recording material.

3. The fixing unit according to claim 1, wherein at least at a portion of the third surface, a distance between the first surface and the third surface is four times a thickness of the film or less.

4. The fixing unit according to claim 1, wherein a distance between the first surface and the third surface differs according to a position in a direction of rotation of the film, and wherein the distance is smallest at a position of a most upstream portion of the first surface in the conveyance direction of the recording material.

5. The fixing unit according to claim 4, wherein, a portion of the third surface including a starting end of the third surface in the direction of rotation of the film is formed such that the distance between the first surface and the portion of the third surface decreases toward a downstream side in the direction of rotation.

6. The fixing unit according to claim 4, wherein a portion of the third surface including a terminal end of the third surface in the direction of rotation of the film is formed such that the distance between the first surface and the portion of the third surface increases toward a downstream side in the direction of rotation.

7. The fixing unit according to claim 1, wherein the third surface extends in parallel with the first surface.

8. The fixing unit according to claim 1, wherein the third surface is inclined with respect to the first surface such that the third surface recedes further away from the first surface at a position closer to a center of the film in the longitudinal direction.

9. The fixing unit according to claim 8, wherein an inclination angle of the third surface to the first surface differs according to a position in a direction of rotation of the film, and wherein the inclination angle is smallest at a position of a most upstream portion of the first surface in the conveyance direction of the recording material.

10. The fixing unit according to claim 1, wherein a protruded length of the third surface in the longitudinal direction with respect to the second surface is shorter than a protruded length of the first surface in the longitudinal direction with respect to the second surface.

11. The fixing unit according to claim 1, wherein the heater is held by the internal guide and configured to generate heat in a case where an electric current is supplied, and wherein the fixing unit is configured to heat an image on the recording material by using the film heated by the heater.

12. An image forming apparatus comprising:

an image forming unit configured to form an image on a recording material; and the fixing unit according to claim 1 configured to fix the image to the recording material.

* * * * *